US012600638B2

(12) United States Patent
Auner et al.

(10) Patent No.: US 12,600,638 B2
(45) Date of Patent: Apr. 14, 2026

(54) LOW TEMPERATURE PROCESS FOR THE SAFE CONVERSION OF THE SIEMENS PROCESS SIDE-PRODUCT MIXTURE TO CHLOROMONOSILANES

(71) Applicant: MOMENTIVE PERFORMANCE MATERIALS INC., Waterford, NY (US)

(72) Inventors: Norbert Auner, Glashütten (DE); Alexander Sturm, Mainz (DE)

(73) Assignee: MOMENTIVE PERFORMANCE MATERIALS INC., Waterford, NY (US)

( * ) Notice: Subject to any disclaimer, the term of this patent is extended or adjusted under 35 U.S.C. 154(b) by 508 days.

(21) Appl. No.: 17/441,800

(22) PCT Filed: Mar. 25, 2020

(86) PCT No.: PCT/US2020/024640
§ 371 (c)(1),
(2) Date: Sep. 22, 2021

(87) PCT Pub. No.: WO2020/205356
PCT Pub. Date: Oct. 8, 2020

(65) Prior Publication Data

US 2022/0169520 A1 Jun. 2, 2022

(30) Foreign Application Priority Data

Mar. 29, 2019 (EP) .................................... 19000159
Sep. 10, 2019 (EP) .................................... 19196342

(51) Int. Cl.
*C01B 33/107* (2006.01)

(52) U.S. Cl.
CPC .... *C01B 33/10757* (2013.01); *C01P 2002/86* (2013.01)

(58) Field of Classification Search
CPC ............ C01B 33/10757; C01B 33/107; C01P 2002/86
See application file for complete search history.

(56) References Cited

U.S. PATENT DOCUMENTS 4,719,093 A 1/1988 Falk et al.
6,013,235 A 1/2000 Brinson et al.
(Continued)

FOREIGN PATENT DOCUMENTS

DE 3503262 A1 * 8/1986
DE 102010043646 A1 5/2012
(Continued)

OTHER PUBLICATIONS

Gupper et al. Eur. J. Inorg. Chem. 2001, 2007-22011 (Year: 2001).*
(Continued)

*Primary Examiner* — Sally A Merkling
*Assistant Examiner* — Jordan W Taylor
(74) *Attorney, Agent, or Firm* — James C. Abruzzo

(57) ABSTRACT

The invention relates to a process for the production of monosilanes of formula H4-nSiCln with n being 2, 3 or 4 comprising the step of subjecting a starting material composition comprising one or more disilanes with formula HxSi2Cl6-x containing at least one Si—H bond and optionally further silanes, in particular the side-product mixture of the Siemens Process or fractions thereof, to a reaction with a reaction-promoting agent chosen from—ether/HCl solutions—amines, phosphines, or mixtures thereof—ammonium halides, phosphonium halides, or mixtures thereof at temperatures below 200° C.

20 Claims, 3 Drawing Sheets

$^{29}$Si NMR spectra of the starting disilane mixture 5 (top) with magnification of the spectrum range from +15 to -1 ppm and the product mixture after reaction with a 2.5M HCl/nBu2O (bottom, example 10c).

(56) References Cited

U.S. PATENT DOCUMENTS

| | | | | |
|---|---|---|---|---|
| 8,697,901 | B2 * | 4/2014 | Lewis | B01J 31/24 556/468 |
| 2009/0057129 | A1 * | 3/2009 | Shimizu | C01B 33/1071 203/32 |
| 2013/0294995 | A1 * | 11/2013 | Mueh | C01B 33/10773 423/342 |
| 2017/0166452 | A1 * | 6/2017 | Auner | C01B 33/10757 |

FOREIGN PATENT DOCUMENTS

| | | | | |
|---|---|---|---|---|
| DE | 102015009129 | A1 | 1/2016 | |
| JP | 2013203649 | A * | 10/2013 | |
| WO | WO-2012062562 | A2 * | 5/2012 | C01B 33/043 |
| WO | 2016011993 | A1 | 1/2016 | |
| WO | WO-2019022878 | A1 * | 1/2019 | |

OTHER PUBLICATIONS

Muh et al. English Translation (Year: 2012).*
Staudigl DE3503262A1 English Translation (Year: 1986).*
Sturm et al. Chem. Eur. J. 2018, 24, 17796-17801 (Year: 2018).*
Saiki et al. JP2013203649A English Translation (Year: 2013).*
Urry (Acc. Chem. Res. 1970, 3, 9, 306-312; cited in IDS dated Feb. 1, 2022) (Year: 1970).*
International Search Report and Written Opinion from PCT/US2020/024640 mailed Jul. 3, 2021.
A.G. Sturm et al, Lewis Based catalyzed selective Chlorination of Monosilanes, Chem. Eur. J. 2018, 24, 17796-17801.
Grant Urry: “Systematic synthesis in the polysilane series”; Accounts of Chemical Research 3(9): 1970, 306-312.
X. Zhou et al, “Study on the Shock Sensitivity of the Hydrolysis Products of Hexachlorodisilane”; Ind. Eng. Chem. Res.; 2018, 57: 10354-10364.

* cited by examiner

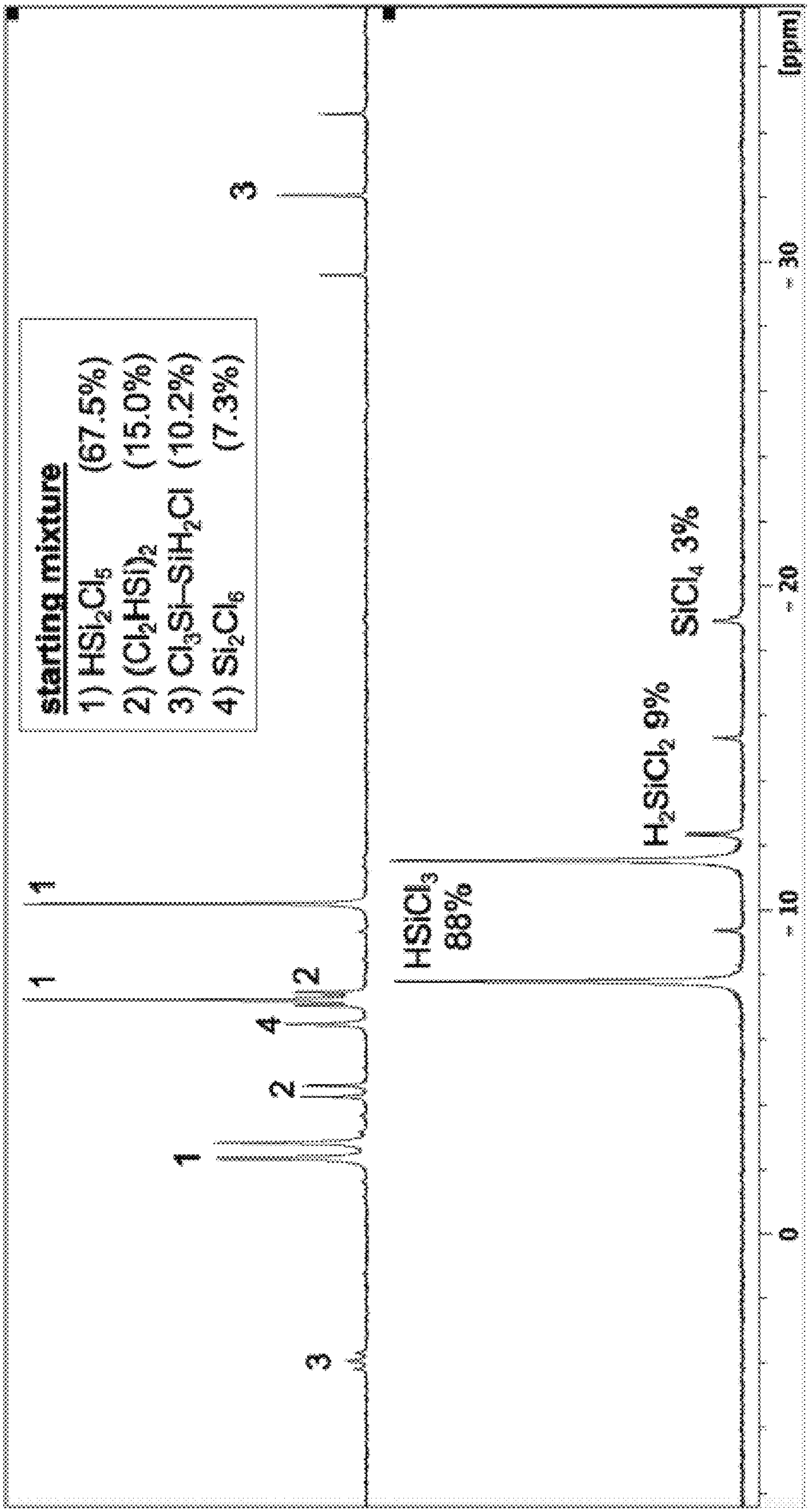
Figure 1: $^{29}Si$ NMR spectra of the starting disilane mixture 2 (top) and the product mixture after reaction with a 5M HCl/1,4-dioxane solution (bottom, example 8).

Figure 2: $^{29}$Si NMR spectra of the starting disilane mixture 2 (top) and the isolated volatile product mixture from reaction of the disilane mixture 2 with $nBu_3P$ (bottom, example 5).
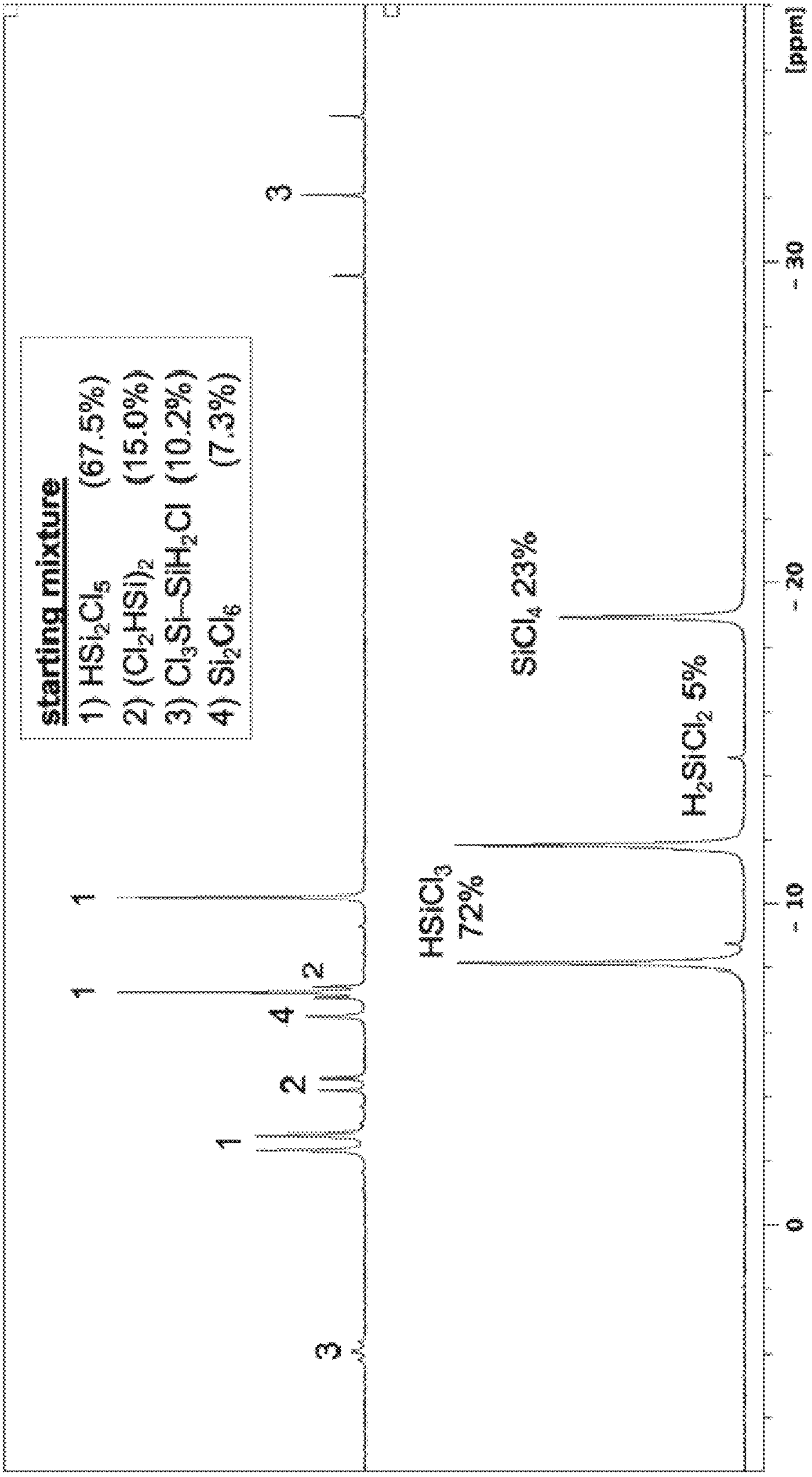

Figure 3: $^{29}Si$ NMR spectra of the starting disilane mixture 6 (top) with magnification of the spectrum range from +15 to -1 ppm and the product mixture after reaction with a 2.5M HCl/$nBu_2O$ (bottom, example 10c).
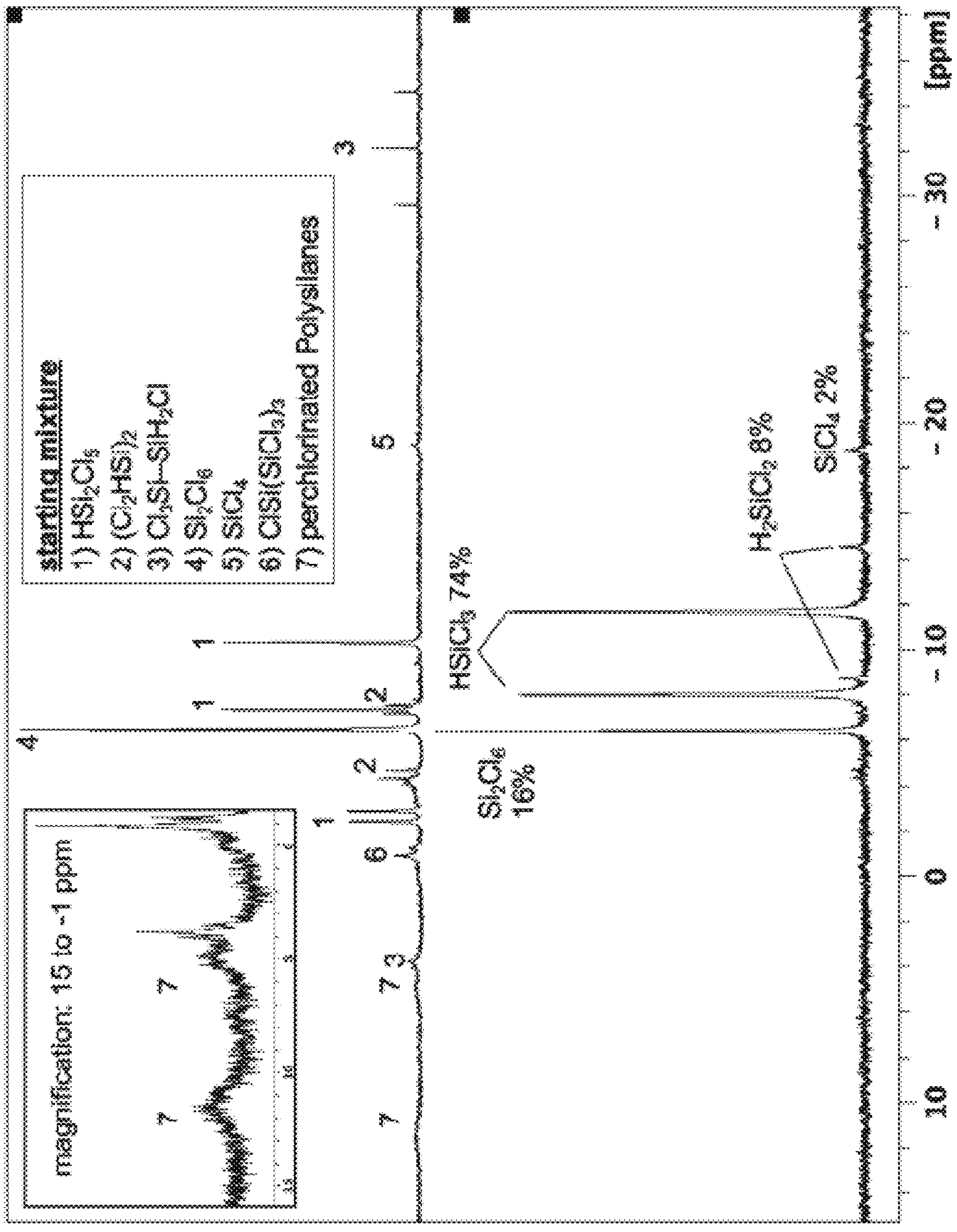

LOW TEMPERATURE PROCESS FOR THE SAFE CONVERSION OF THE SIEMENS PROCESS SIDE-PRODUCT MIXTURE TO CHLOROMONOSILANES

CROSS-REFERENCE TO RELATED APPLICATIONS

The present application is a U.S. National Phase Application of PCT International Application No. PCT/US2020/024640, filed on Mar. 25, 2020; to which priority is claimed from EP Patent Application No. 19000159.4, filed Mar. 29, 2019 and EP Patent Application No. 19196342.0, filed Sep. 10, 2019; both of which are incorporated herein by reference in their entireties.

TECHNICAL FIELD

The present invention relates to the production of chlorosilane monomers, in particular to the production of trichlorosilane, starting from hydridochlorodisilanes and further chlorosilane species contained in the mixture of side-products of the Siemens Process by cleavage of the silicon-silicon bonds in the presence of a reaction-promoting agent, and optionally of additional compounds containing at least one Si—H bond as hydrogen source at low temperatures.

BACKGROUND OF THE INVENTION

Hydridochloromonosilanes are useful starting materials in synthetic organosilicon chemistry and other applications, in particular trichlorosilane is utilized in the production of high purity polycrystalline silicon applying the Siemens Process.

High purity semiconductor-grade silicon is mainly produced by the "Siemens Process", first reacting elemental silicon with hydrogen chloride to give trichlorosilane $HSiCl_3$, then gaseous $HSiCl_3$ is reduced in the presence of hydrogen and deposited onto a heated silicon rod ($HSiCl_3+H_2 \rightarrow Si+3HCl$; $4HSiCl_3 \rightarrow Si+3SiCl_4+2\ H_2$). In this process only about one third to one fourth of the silicon fed as $HSiCl_3$ is deposited as elemental silicon, with the remainder exiting the reactor as an effluent gas typically comprising more than 85 mol % unreacted trichlorosilane, 5-15 mol % $SiCl_4$ that is formed by dehydrogenation of $HSiCl_3$ and up to about 1 mol % of chlorodisilanes $H_oSi_2Cl_{6-o}$ (o=0-6) and particulate silicon. U.S. Pat. No. 6,013,235 (Dow Corning, 2000) reports that the high boiling residue can constitute as much as ten weight-% of the $HSiCl_3$ in current commercial operations for the process. The high boiling fraction not only consists of hexachlorodisilane and hydridochlorodisilanes, a typical composition of such a high boiling residue can comprise: 68 weight-% of disilanes and 31 weight-% of disiloxanes, 0.5 weight-% of other high boiling silicon-containing compounds and 0.5 weight-% of a solid particulate containing silicon, low levels of metals such as Al, Ca, Fe and compounds thereof.

In the reaction of silicon with hydrogen chloride, a chlorosiloxane mixture is obtained which consists mainly of hexachloro- and pentachlorodisiloxane as main components. These chlorosiloxanes are formed by the reaction of chlorosilanes with water, which enters the production process as moisture with moist raw materials such as chlorine, hydrogen chloride or metallic silicon, or it gains entry into the production apparatus with humid air when the reactor is charged or cleaned in discontinuous processes. Usually the $SiCl_4$ and $HSiCl_3$ exiting the reactor are separated from the above-mentioned byproducts by distillation. This results in a mixture of chlorosiloxanes, metal chlorides and ash, which must be disposed along with a small amount of $SiCl_4$. In a CVD process the effluent gas is separated by distillation into a low boiling fraction of mainly $H_2SiCl_2$ and $HSiCl_3$, which is recycled to the CVD reactor, and a high boiling fraction consisting of $SiCl_4$, the chlorodisilanes, chlorodisiloxanes and particulate silicon. This latter fraction is further processed to separate the remaining disilanes (and disiloxanes), that are cracked with hydrogen chloride in a catalyzed high temperature step, e.g. $Si_2Cl_6+HCl \rightarrow SiCl_4+HSiCl_3$, and particulate silicon is separated there from by spray drying. The catalyst, e.g. palladium on a solid support, effects conversion to monosilanes. In alternative processes the high boiling disilane fraction serves as starting material for the isolation of highly pure hexachloro-, pentachloro- and tetrachlorodisilanes. In view of the fact that the production of polycrystalline silicon has increased from 18200 t in 2000 to 391000 t in 2016 and expecting a further economic growth of more than 15% annually worldwide, a preparatively facile low temperature conversion of the high boiling side-products of the Siemens Process into $HSiCl_3$ in high yields is a global necessity to increase economic benefit and to minimize environmental pollution. The need for a facile and non-hazardous low-temperature process for the conversion of mixtures as obtained from the reactor of the Siemens Process is increased by the fact that a number of compounds typically contained in the side-product mixture or generated in contact with air and moisture, in particular hydrolysis products of $Si_2Cl_6$ and chlorohydrodisilanes, is difficult to handle and may cause severe accidents. Storage of the side-product mixture and aging of polymers contained in the side-product mixture even aggravates aforementioned problem (see: X. Zhou et al, in: Study on the Shock Sensitivity of the Hydrolysis Products of Hexachlorodisilane, Ind. Eng. Chem. Res. 2018, 57, 10354-10364).

1) U.S. Pat. No. 6,013,235 discloses the conversion of Direct Process high boiling residue to monosilanes. The process comprises contacting a high-boiling residue resulting from the reaction of HCl and silicon metalloid, with $H_2$ gas in the presence of a catalytic amount of $AlCl_3$ effective in promoting conversion of the residue to monosilanes.
2) In U.S. Pat. No. 4,719,093 a process for the cleavage of chlorosiloxanes, mainly hexa- and pentachlorodisiloxane, in the presence of HCl or $Cl_2$ gas at elevated temperatures yielding $HSiCl_3$ and $SiCl_4$ is disclosed.
3) DE 102010043646 A1 discloses a process for the production of trichlorosilane by reaction of perchlorinated polysilanes with hydrogen chloride at 90° C. and a catalyst.
4) WO 2016/011993 A1 discloses a method for cleaving silicon-silicon bonds and/or silicon-chlorine bonds in monosilanes, polysilanes and/or oligosilanes by use of ether/HCl solutions.

Problem to be Solved

The problem to be solved by the present invention is the provision of a process for the production of chloromonosilanes, in particular tetrachlorosilane, trichlorosilane and dichlorosilane, very particular trichlorosilane, by submitting a starting material composition comprising one or more hydridochlorodisilanes and optionally further disilanes, mono-, oligo- and polysilanes and disiloxanes to reaction conditions under which the desired products are obtained by Si—Si-bond cleavage at low temperatures. In particular, it is the object of the invention to provide a new process for the utilization of the side-product mixture of the Siemens Process as starting material, thus providing a process with improved performance over the conventional methods regarding

- atom economy
- energy consumption and efficiency
- process safety and

- avoidance of environmental pollution.

The present invention aims at the provision of a process with improved product yields, product purity, product selectivity of the conversion, convenience of the work-up procedure, ease of handling of the reagents and cost efficiency of the process when compared to processes of the prior art. The problem to be solved is in particular the provision of such an improved process applicable to the utilization of the side-product mixture of the Siemens Process or fractions thereof, in which a high yield of trichlorosilane can be obtained, which is environmentally benign, less hazardous and less demanding regarding the materials of the reactors used due to the low reaction temperature of the process. Further, the problem to be solved comprises the provision of a process by which tetra-, tri- and dichlorosilane can be obtained in high yield from disilanes from the side-product mixture of the Siemens Process, which solves safety issues usually involved in dealing with the side-products of the Siemens Process by fully converting hazardous components formed upon storage of the side-products and their precursors under the reaction conditions of the process, thus circumventing the extremely dangerous handling of so-called "popping gels" by converting these compounds and their precursors instead of disposing them by combustion.

According to the present invention, this problem is solved as described in the following.

DETAILED DESCRIPTION OF THE INVENTION

The present invention relates to a process for the production of chloromonosilanes starting from hydridodisilanes and optionally further disilanes, disiloxanes, mono-, oligo- and polysilanes or mixtures thereof by cleavage of silicon-silicon bonds and redistribution reactions at low temperatures.

(1) Subject of the invention is a process for the production of chlorosilanes of the general formula (I)

$$H_{4-n}SiCl_n \quad (I)$$

wherein n=2, 3 and 4, preferably n=3, by reacting a starting material composition comprising one or more of the substrates selected from A) disilanes of the general formula (II)

$$H_oSi_2Cl_{6-o} \quad (II)$$

wherein o=0-6, preferably o=0-2, most preferably 0-1, and wherein for one or more disilanes o≥1, and optionally further comprising B) disiloxanes of the general formulae (III) or (IV)

$$(H_pSi_2Cl_{5-p})_2O \quad (III)$$

$$(H_qCl_{3-q}Si)_2O \quad (IV)$$

wherein p=0-5, preferably p=0-1, q=0-2, more preferably q=0-1,

C) chloromonosilanes of the general formula (V)

$$SiH_rCl_{4-r} \quad (V)$$

wherein r=0-2, preferably r=0-1, most preferably r=0,

D) perchlorinated oligo- and polysilanes of the general formula (VI)

$$Si_sCl_{2s+2} \quad (VI)$$

wherein s=3-6,

E) chloro-, hydrido- and hydroxy-substituted polysilanes, including linear, branched, cyclic and cage-like chloro-, hydrido- and hydroxy-substituted oligo- and polysilanes, and chloro-, hydrido- and hydroxy-substituted polysiloxanes, with one or more reaction-promoting agents F) selected from the group consisting of

- ether/HCl solutions,
- amines, phosphines, or mixtures thereof, and
- ammonium halides, phosphonium halides, or mixtures thereof, optionally in the presence of one or more additional compounds containing at least one Si—H bond selected from G) monosilanes of the general formula (VII)

$$R_tSiCl_uH_{4-(t+u)} \quad (VII)$$

wherein t=0-3, preferably 1-3, more preferably 2,
u=0-2, preferably 0,
t+u=0-3, preferably 1-3, more preferably 2,
R is an organic residue, H) disilanes of the general formula (VIII)

$$R_vSi_2Cl_wH_{6-(v+w)} \quad (VIII)$$

wherein v=0-5, preferably 1-5,
w=0-5, preferably 0,
v+w=1-5,
R is defined as above, at temperatures below 200° C.

The reaction according to the invention primarily involves the cleavage of the hydrido-disilanes of the general formula (II) with o≥1 mandatorily contained in the starting material composition, but may also involve the cleavage of further disilanes A), disiloxanes B), perchlorinated oligo- and polysilanes D), chloro-, hydrido- and hydroxy-substituted polysilanes, including linear, branched, cyclic and cage-like chloro-, hydrido- and hydroxy-substituted oligo- and polysilanes E), and, if added to the starting material composition, disilanes H).

According to the invention, the term "cleavage" is used to describe the transformation by which the compounds of the above-cited components A), B), D) and E) are reacted to produce monomeric silanes represented by the general formula (I), and to monomeric silanes of the general formula (I) and analogues thereof substituted with organic residues R in case of the disilanes H). In the case of disilanes, oligo- and polysilanes the cleavage reactions are effected by breaking the bond connecting the silicon atoms of these di-, oligo- and polysilanes. In the case of disiloxanes, the term "cleavage" also applies to the breaking of Si—O bonds. In general, the cleavage reactions of the process according to the invention comprise in particular hydrochlorination and hydrogenolysis reactions.

The reaction according to the invention may, depending on the reaction-promoting F) applied and the specific constituents A)-E) and G)-H) present in the starting material compositions, also involve redistribution reactions. According to the present invention, the term "redistribution reaction" describes the redistribution of hydrogen and chlorine substituents bound to silicon atoms of one or more silane and/or siloxane compounds comprised in the reaction mixture by exchange of these substituents. The exchange can be monitored in particular by $^{29}$Si NMR, by GC and/or GC/MS. The redistribution reactions are catalyzed by the reaction-promoting agents F).

The disilanes A) of the general formula (II)

$$H_oSi_2Cl_{6-o} \quad (11)$$

can also be depicted by the structural formula:

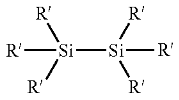

wherein the substituents R' are independently selected from hydrogen (H) and chlorine (Cl), and wherein the number of hydrogen atoms o=0 to 6, and the number of chlorine atoms 6-o=0 to 6.

Preferably the number of hydrogen atoms is o=0-2, i.e. formula (II) is preferably representing hexachlorodisilane, pentachlorodisilane and one or both isomers of tetrachlorodisilane, and most preferably o=0-1, i.e. formula (II) is most preferably representing hexachlorodisilane and pentachlorodisilane. According to the invention, the presence of one or more disilanes having one or more Si—H bonds, i.e. the presence of a hydridodisilane, in the starting material composition is mandatory.

Optionally, the starting material composition may comprise disiloxanes B) of the general formulae (III) and (IV).

The disiloxanes of the general formula (III)

$$(H_pSi_2Cl_{5-p})_2O \quad (III)$$

can be depicted also by the structural formula:

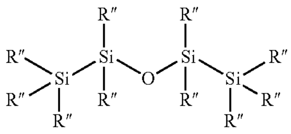

wherein the substituents R" are independently selected from hydrogen (H) and chlorine (Cl), and wherein the number of hydrogen atoms per disilyl unit is p=0 to 5, and the number of chlorine atoms 5-p=0 to 5.

Preferably, the number of hydrogen atoms per disilyl unit is p=0-1, resulting in a preferred total number of hydrogen atoms per disiloxane of the formula (III) of 0 to 2.

The disiloxanes of the general formula (IV)

$$(H_qCl_{3-q}Si)_2O \quad (IV)$$

can be depicted also by the structural formula:

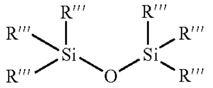

wherein the substituents R"' are independently selected from hydrogen (H) and chlorine (Cl), and wherein the number of hydrogen atoms per silyl unit is q=0 to 2, and the number of chlorine atoms 3-q=1 to 3.

Preferably, the number of hydrogen atoms per silyl unit is q=0-1, resulting in a preferred total number of hydrogen atoms per disiloxane of the formula (IV) of 0 to 2.

Disiloxanes, in particular the disiloxanes of the general formulae (III) and (IV) as described above, may constitute a component of the side-product mixture obtained from the Siemens Process.

Subsequently, the terms "side-product mixture obtained from the Siemens Process", Siemens Process side-product mixture", "effluent exiting the CVD reactor of the Siemens Process" and "effluent exiting the reactor of the Siemens Process" will be used synonymously, unless a specific of the respective composition is given in the context.

The amount of disiloxanes found in the Siemens Process side-product mixture depends on the specific reaction parameters chosen for the process and in particular on the amount of water present during the reaction due to moist starting materials or moisture in the reaction atmosphere. In the sense of this invention, disiloxanes formed immediately after the efflux of the side-product mixture from the Siemens Process reactor due to contact with ambient air and during the handling of the side-product mixture are also considered as formed during the Siemens Process.

Optionally, the starting material composition may further comprise chloromonosilanes C) of the general formula (V)

$$SiH_rCl_{4-r} \quad (V)$$

wherein r=0-2, preferably r=0-1, most preferably r=0.

This means that di-, tri- and tetrachlorosilane are preferably comprised by the starting material composition, more preferably comprised are tri- and tetrachlorosilane, and tetrachlorosilane is most preferably comprised by the starting material composition.

In many cases, the effluent exiting the reactor of the Siemens Process comprises more than 85 mol-% of unreacted trichlorosilane and 5-15 mol % of $SiCl_4$ that is formed by dehydrogenation of $HSiCl_3$. In other cases, tetrachlorosilanes may constitute the major component by weight of the effluent exiting the reactor of the Siemens Process.

In case the low-boiling components of the side-product mixture of the Siemens Process are removed, in particular by means of distillation or condensation, before such substrate is submitted to the process according to the invention as starting material composition, only minor amounts or no chloromonosilanes C) are present in the starting material composition.

If no step for the removal of low-boiling components of the Siemens Process side-product mixture is taken, however, the chloromonosilanes C) may constitute a major part of the starting material composition.

In such case it is preferred that the process according to the reaction is performed in the presence of one or more additional compounds containing at least one Si—H bond selected from G) or H), and that a reaction-promoting agent F) selected from amines, phosphines, ammonium halides, phosphonium halides or mixtures thereof is present in the reaction mixture.

It is particularly preferred that the additional compound containing at least one Si—H bond selected from G) or H) is selected from methylhydridosilanes or methylhydridodisilanes, most preferably it is dimethylsilane.

It is also preferable that the molar ratio of hydrogen atoms bonded to Si atoms in the additional compounds containing at least one Si—H bond and the chlorine atoms bonded to Si atoms in the chloromonosilanes C) present in the starting material composition is in the range from 0.5 to 2.0.

Optionally, the starting material composition according to the invention may further comprise perchlorinated oligo- and polysilanes D) of the general formula (VI)

$$Si_sCl_{2s+2} \quad (VI)$$

wherein s=3-20

Perchlorinated oligo- and polysilanes D) are a further typical constituent of the Siemens Process side-product mixture. It is present both in the efflux from the reactor as well as in the higher-boiling fraction obtained upon removal of the lower-boiling monosilanes. The conversion of such residues to monosilanes usually requires high-temperature processes, but can be achieved according to the present invention at temperatures below 200° C.

Another component optionally comprised by the starting material composition according to the invention are chloro-, hydrido- and hydrido-substituted polysilanes, including linear, branched, cyclic and cage-like chloro-, hydrido- and hydroxy-substituted oligo- and polysilanes, and chloro-, hydrido- and hydroxy-substituted polysiloxanes E). Such compounds can be formed during the Siemens Process and in particular during storage of the Siemens Process side-product mixture containing chlorooligo- and chloropolysilanes in the presence of moisture and/or oxygen, in particular at elevated temperatures. The residues formed by aging of the polymer components obtained in the Siemens Process as side-products under above-stated conditions are generally termed “popping gels”, which refers to the hazardous properties of such gels, in particular to their explosiveness. In order to prevent the formation of popping gels by aging of the polymeric compounds contained in the side-product mixture and to destroy such compounds already formed, the side-product mixtures of the Siemens Process are often disposed by combustion at high temperatures, resulting in environmentally benign processes with low economic efficiency. In the process according to the present invention, the formation of popping gels is prevented by direct conversion of all precursor compounds and already formed compounds E) subsequent to the Siemens Process, in particular by direct utilization of the efflux exiting the CVD reactor of the Siemens Process in the process according to the invention.

In the process according to the invention, the cleavage reaction and, optionally, the redistribution reactions yielding the desired products are conducted by subjecting the disilane substrate or substrates A) and the optional further components B) to E) of the starting material composition to the reaction in the presence of one or more reaction-promoting agents F) selected from the group consisting of

- ether/HCl solutions,
- amines, phosphines, or mixtures thereof, and
- ammonium halides, phosphonium halides, or mixtures thereof.

The term “ether/HCl solution” according to the invention refers to any reagent containing an ether compound and HCl, regardless if the HCl is absorbed by the ether compound or dissolved in the ether solvent. The term of “absorbing” or “absorption”, respectively, refers to the process of one material (absorbate), in this case hydrogen chloride, being retained by another one (absorbent), in this case the ether compound. The term of dissolving or dissolution, respectively, refers to the mixing of two phases with the formation of one new homogeneous phase, which in this case is a solution of hydrogen chloride in the ether compound.

The ether/HCl reagent may either be prepared in advance and then be applied in the process according to the invention, or ether may be added to the reaction mixture or a reactor before subsequently HCl gas is added and ether/HCl reagent is formed in situ.

According to the invention, the term “ether compound” shall mean any organic compound containing an ether group —O—, in particular, of the formula $R_1$—O—$R_2$, wherein $R_1$ and $R_2$ are independently selected from a monovalent organyl group, which is bonded to oxygen via a carbon atom. Preferably, $R_1$ and $R_2$ are substituted or unsubstituted linear or branched alkyl groups or aryl groups, which may have further heteroatoms such as oxygen, nitrogen, or sulfur. In the case of cyclic ether compounds, $R_1$ and $R_2$ can constitute together an optionally substituted alkylene or arylene group, which may have further heteroatoms such as oxygen, nitrogen, or sulfur.

The ether compounds can be symmetrical or asymmetrical with respect to the substituents at the ether group —O—.

Preferably, the ether compounds according to the invention are selected from the group consisting of linear and cyclic ether compounds.

Herein, a linear ether compound is a compound containing an ether group $R_1OR_2$ as defined above, in which there is no connection between the $R_1$ and $R_2$ groups except the oxygen atom of the ether group, as for example in the symmetrical ethers $Et_2O$, n-$Bu_2O$, $Ph_2O$ or diisoamyl ether (i-$Pentyl_2O$), in which $R_1$=$R_2$, or in unsymmetrical ethers as t-BuOMe (methyl t-butyl ether, MTBE) or PhOMe (methyl phenyl ether, anisol).

A cyclic ether compound according to the invention is a compound in which one or more ether groups are included in a ring formed by a series of atoms, such as for instance 1,4-dioxane, which can be substituted e.g. by alkyl groups.

Also preferably, the ether compound is selected from the group consisting of diethyl ether, di-n-butyl ether, dioxane, preferably diethyl ether and di-n-butyl ether.

In a further preferred embodiment, the ether compound is selected from 1,4-dioxane, diethyl ether or di-n-butyl ether.

Further preferably, the process according to the invention is carried out with an ether compound saturated with HCl.

In the sense of the present invention, the term “saturated” refers to a saturated solution of hydrogen chloride in the ether compound applied, and is defined as a solution which has the same concentration of a solute as one that is in equilibrium with undissolved solute at specified values of the temperature and pressure. In the sense of present invention, a solution being close to the state of saturation is also comprised by the term “saturated”. Such saturated solution can be prepared by passing gaseous hydrogen chloride into the corresponding ether compound (e.g. diethyl ether, di-n-butyl ether) at about −10 to about +10° C. The ether is saturated when excess HCl gas is evaporated over the overpressure valve as fast as it is introduced into the solvent.

Preferably, the HCl content of the ether solvent in the reaction step A) is >about 0.1 mol/l, more preferred >about 1.0 mol/l, even more preferred >about 3 mol/l, and most preferably the ether solvent is saturated with HCl as defined above.

In the context of this invention, it is also referred to $Et_2O$ used as solvent containing HCl as HCl/diethyl ether reagent, it is referred to di-n-butyl ether used as solvent containing HCl as HCl/di-n-butyl ether reagent, and it is referred to 1,4-dioxane used as solvent containing HCl as HCl/1,4-dioxane reagent.

Preferably, the reaction of the process according to the invention is carried out with di-n-butyl ether or 1,4-dioxane saturated with HCl serving as the ether solvent saturated with HCl. Further preferably, the saturation of the di-n-butyl ether or 1,4-dioxane with hydrogen chloride is performed as described above, by passing gaseous hydrogen chloride into di-n-butyl ether or 1,4-dioxane.

According to the invention, when referring to the reaction-promoting agent F) the term “amine” is understood as a compound selected from amines $R^1_3N$, wherein $R^1$ is hydrogen or an organyl group and can be the same or different, preferably it refers to tertiary amines RN, wherein R is an organyl group and can be the same or different, such as $n\text{-}Bu_3N$ or $NPh_3$.

In preferred compounds F) selected from triorganoamines $NR_3$, R is an organyl group and can be the same or different, more preferably R is an alkyl, cycloalkyl or aryl group, most preferably the organoamine is $NPh_3$ or $n\text{-}Bu_3N$. Further, the term "amines" according to the invention comprises heterocyclic amines.

According to the invention, when referring to the reaction-promoting agent F) the term "phosphine" is understood as a compound selected from phosphines $R^1{}_3P$, wherein $R^1$ is hydrogen or an organyl group and can be the same or different, preferably $R_3P$, wherein R is as defined above and can be the same or different, such as, $PPh_3$.

In preferred compounds F) selected from triorganophosphines $PR_3$, R is an organyl group and can be the same or different, more preferably R is an alkyl, cycloalkyl or aryl group, most preferably the organophosphine is $Cy_3P$, $PPh_3$ or $n\text{-}Bu_3P$.

According to the invention, the terms "ammonium halides" and "phosphonium halides" refer to onium compounds $R_4QX$, wherein each R is independently a hydrogen or an organyl group, Q is nitrogen or phosphorus, and X is a halide selected from the group consisting of F (fluorine), Cl (chlorine), Br (bromine) and I (iodine). Further, the term comprises heterocyclic ammonium halides.

In the sense of the present invention, an organyl group is any organic substituent group, regardless of functional type, having one free valence at a carbon atom.

Preferably, the quaternary compound $R_4QX$ with Q=N, P is represented by the formula $R_4PCl$ wherein R is independently a hydrogen group or an organyl group, more preferably a hydrogen group, an aromatic group preferably having up to about 30 carbon atoms or an aliphatic hydrocarbon group preferably having up to about 30 carbon atoms.

Even more preferably, R is independently a hydrogen or an alkyl, cycloalkyl, aryl or alkaryl group having from about 1 to about 30 carbon atoms, preferably about 2 to about 16 carbon atoms. Preferred groups R include methyl, butyl such as n-butyl, iso-butyl, hexyl such as n-hexyl, tetradecyl, such as n-tetradecyl, octyl, such as n-octyl.

Particularly preferred examples of the ammonium halides or phosphonium halides according to the invention are tetra(n-butyl)phosphonium chloride, tetra(n-butyl)phosphonium bromide, trihexyl(tetradecyl)phosphonium bromide, methyltri(isobutyl)phosphonium bromide, methyltri (isobutyl)phosphonium chloride, tetra(n-octyl)phosphonium chloride, tri(n-butyl)tetradecylphosphonium chloride, and octyltri(n-butyl)phosphonium chloride.

Preferably, the heterocyclic amine according to the invention has at least one nitrogen atom in at least one 4- to 8-membered hydrocarbon ring, wherein the ring atoms adjacent to the nitrogen are carbon or nitrogen, and the hydrocarbon ring or rings are, independently of one another, aromatic or non-aromatic hydrocarbon rings.

More preferably, the heterocyclic amine contains a five-membered ring with 1 to 3 nitrogen atoms.

Even more preferably, the heterocyclic amine is imidazole or a substituted imidazole selected from the group consisting of 1-methylimidazole, 2-methylimidazole, 2-ethylimidazole, 2-isopropyl-imidazole, 4-methylimidazole, 2,4-dimethylimidazole, 2-(2-imidazolyl)imidazole, 2-phenylimidazole, imidazoline, imidazolidine, pyrazole, 3-methylpyrazole, pyrrolidone, N-methylpyrrolidone, 1,3-dimethyl-2-imidazolidone, 1,2,3-triazole, and 1,2,4-triazole.

Preferably, the heterocyclic ammonium halide is derived from a heterocyclic amine having at least one nitrogen atom in at least one 4- to 8-membered hydrocarbon ring, wherein the ring atoms adjacent to the nitrogen are independently carbon or nitrogen atoms, and the hydrocarbon ring or rings are, independently of one another, aromatic or non-aromatic hydrocarbon rings, wherein the halide is fluoride, chloride, bromide.

More preferably, the heterocyclic ammonium halide is derived from a heterocyclic amine with 1 to 3 nitrogen atoms in a five-membered ring, and the halide is fluoride, chloride, bromide or iodide.

Even more preferably, the heterocyclic ammonium halide is 1,2-dimethyl-3-(n-propyl)-imidazolium chloride, 1-ethyl-3-methylimidazolium bromide, 1,2-dimethyl-3-(n-butyl) imidazolium chloride, 1-butyl-3-methyl-imidazolium chloride, 1-(3-cyanopropyl)-3-methylimidazolium chloride, or 1-methylimidazolium chloride.

In another preferred embodiment according to the invention, the ammonium halides or phosphonium halides are represented by the formula $R_4PCI$, wherein R is independently a hydrogen group or an organyl group, more preferably a hydrogen group, an aliphatic hydrocarbon or an aromatic group.

Preferably, R is independently a hydrogen or an alkyl, cycloalkyl, aryl or alkaryl group of from about 1 to about 30 carbon atoms, preferably about 2 to about 16 carbon atoms. R include methyl, butyl such as n-butyl, iso-butyl, hexyl such as n-hexyl, tetradecyl, such as n-tetradecyl, octyl, such as n-octyl.

Particularly preferred examples of ammonium halides or phosphonium halides according to the invention are tetra(n-butyl)phosphonium chloride, tetra(n-butyl)phosphonium bromide, trihexyl(tetradecyl)phosphonium bromide, methyltri(isobutyl)phosphonium bromide, methyltri(isobutyl) phosphonium chloride, tetra(n-octyl)phosphonium chloride, tri(n-butyl)tetradecylphosphonium chloride, and octyltri (butyl)phosphonium chloride.

When the reaction-promoting agent F) is selected from HCl/ether solutions, the ratio of HCl to disilanes, disiloxanes, oligo- and polysilanes in the starting material composition based on the molar amount of HCl and the molar amount of Si—Si bonds contained in the compounds of the starting material composition is preferably in the range of 0.1 to 20.0, more preferably in the range of 0.5 to 10.0, even more preferably in the range of 1.0 to 8.0, and most preferably in the range of 1.0 to 5.0, i.e. in the range of 1 HCl molecule per 1 Si—Si bond (=1.0) to 5 HCl molecules per 1 Si—Si bond (=5.0) is most preferred.

When the reaction-promoting agent F) is selected from amines, phosphines, ammonium halides or phosphonium halides, the amount of the catalyst is preferably in the range of 0.01 wt-% to 30 wt-%, more preferably in the range of 1 wt-% to 20 wt-%, even more preferably in the range of 3 wt-% to 15 wt-% and most preferably in the range of 5 wt-% to 10 wt-% based on the weight of the compounds of the starting material composition.

The reaction of the process according to the invention is optionally conducted in the presence of one or more additional compounds containing at least one Si—H bond selected from G) monosilanes of the general formula (VII)

$$R_tSiCl_uH_{4-(t+u)} \quad \text{(VII)}$$

wherein t=0-3, preferably 1-3, more preferably 2, u=0-2, preferably 0, t+u=0-3, preferably 1-3, more preferably 2, R is an organic residue, H) disilanes of the general formula (VIII)

$$R_vSi_2Cl_wH_{6-(v+w)} \quad \text{(VIII)}$$

wherein v=0-5, preferably 1-5, w=0-5, preferably 0, v+w=1-5,

R is defined as above.

Preferably, the monosilanes of the general formula (VII) bear 1 to 3 organic residues, more preferably 1 to 3 organic residues selected from C1-C6 alkyl groups or aryl groups, even more preferably 1 to 3 organic residues independently selected from methyl, ethyl or phenyl groups, and most preferably 1 to 3 methyl groups.

Also preferably, the monosilanes bear 1 to 3 hydrogen atoms, more preferably 1 to 3 hydrogen atoms and no chlorine substituent, even more preferably 2 hydrogen atoms and two organic residues, most preferably the monosilane G) is dimethylsilane.

According to the present invention, the disilanes H) are preferably selected from the group of disilanes of the general formula (VIII) bearing 1 to 5 organic residues, more preferably bearing 1 to 5 organic residues selected from C1-C6 alkyl groups or aryl groups, even more preferably bearing 1 to 5 residues independently selected from methyl, ethyl or phenyl groups, most preferably bearing 1 to 5 methyl groups.

Also preferably, the disilanes H) bear 1 to 5 hydrogen atoms, more preferably 2 to 4 hydrogen atoms and no chlorine substituent, even more preferably 2 or 4 hydrogen atoms and 4 or 2 organic residues, most preferred as disilane H) are $Me_2Si_2H_4$ and $Me_4Si_2H_2$.

The more hydrogen-rich disilane of the aforementioned most preferred disilanes H), $Me_2Si_2H_4$, is insofar advantageous as less of the disilane is required as a hydrogen-donor for a given starting material composition, and thus smaller-scaled reactors can be sufficient.

Further, $MeSiHCl_2$, which is a valuable monosilane, is formed by cleavage of the partially or fully chlorinated redistribution product obtained from $Me_2Si_2H_4$. Formation of organooligosilanes from $Me_2Si_2H_4$ and its reaction products, however, is a drawback of applying this Si—H-bond containing disilane as a hydrogen donor.

$Me_4Si_2H_2$, on the other hand, is not cleaved under the reaction conditions of the process, but acts exclusively as a hydrogen transfer reagent, which is perchlorinated during the reaction and can be recycled by reaction with LiH to give $Me_4Si_2H_2$ again. Separation of the chlorinated product $Me_4Si_2Cl_2$ from the desired products of the general formula (I) is not a problem due to the considerably higher boiling point of $Me_4Si_2Cl_2$ when compared to the boiling points of $HSiCl_3$ and $SiCl_4$.

The process according to the invention is carried out at temperatures below 200° C. Herein, the reaction temperature according to the invention is the temperature of the reaction mixture, i.e. the temperature measured inside the reaction vessel in which the reaction is conducted.

The process according to the invention is characterized in that the starting material composition comprises one or more disilanes A) of the general formula (II) with o≥1, i.e. which contains at least one hydrogen atom bonded to a silicon atom.

(2) In a preferred embodiment of the process according to the invention, wherein the disilane with o≥1 is pentachlorodisilane, more preferably the disilanes with o≥1 are pentachlorodisilane and one or two tetrachlorodisilane isomers, even more preferably the disilane with o≥1 is pentachlorodisilane, wherein hexachlorodisilane is also present in the starting material composition, and most preferably the disilanes with o≥1 are pentachlorodisilane and one or two tetrachlorodisilane isomers, wherein hexachlorodisilane is also present in the starting material composition.

Pentachlorodisilane and tetrachlorodisilanes are typically present as hydrido-disilane constituents in the side-product mixture of the Siemens Process. Therein, they are usually accompanied by varying amounts of hexachlorodisilane.

They are also present in the high-boiling fractions of the Siemens Process side-product mixture, wherein the term “high-boiling” indicates that the compounds contained in these fractions have a boiling point which is that much higher that the separation of the lower-boiling chloromonosilanes $SiCl_4$, $HSiCl_3$, $H_2SiCl_2$ and $H_3SiCl$ by fractional distillation is technically feasible. According to this invention, all compounds having a boiling point 75° C. at standard atmospheric pressure of 101325 Pa are considered as being part of the high-boiling fraction of the Siemens Process side-product mixture.

The Siemens Process side-product mixture, either as obtained from the reactor or as obtained after physical or chemical processing, such as filtration, distillation, condensation, storage or selective conversion or derivatization of specific components of the side-product mixture, is the preferred starting material of the process according to the invention. Typically, the Siemens Process side-product mixture is characterized by comprising at least one, in most cases several disilanes containing at least one Si—H bond.

(3) In a preferred embodiment of the process according to the invention, the temperature is in the range from 10° C. to 160° C., more preferably from 15° C. to 130° C., even more preferably from 20° C. to 100° C., most preferably in the range from 20-80° C.

Herein, the reaction temperature is the temperature of the reaction mixture, i.e. the temperature measured inside the reaction vessel in which the reaction is conducted.

Preferably, the reaction vessel can be an ampoule, a sealed tube, a flask or any kind of chemical reactor, without being limited thereto. The reaction vessel, in particular the reaction reactor or tube, can be designed for a batch-wise or for a continuous production mode.

Further preferably, the reaction step is carried out in a suitably sized reactor made of materials, such as glass or Hastelloy C, which are resistant to corrosion by chlorides. A means of vigorous agitation is provided to disperse or dissolve the reaction-promoting agent F) or mixtures of such agents in the solvent or, when performed neat, in the starting material composition.

(4) In another preferred embodiment of the process according to the invention, the starting material composition comprises the effluent exiting the CVD reactor of the Siemens Process as a side-product.

The Siemens Process, in which elemental silicon is reacted with hydrogen chloride to give trichlorosilane $HSiCl_3$, and gaseous $HSiCl_3$ is reduced in the presence of hydrogen and Si is deposited onto a heated silicon rod ($HSiCl_3+H_2 \rightarrow Si+3HCl$; $4HSiCl_3 \rightarrow Si+3SiCl_4+2H_2$) is the primary commercial method to prepare high-purity polycrystalline silicon. In this process only about one third to one fourth of the silicon fed as $HSiCl_3$ is deposited as elemental silicon, with the remainder exiting the reactor as an effluent gas typically comprising unreacted trichlorosilane or $SiCl_4$ that is formed as main component by dehydrogenation of $HSiCl_3$, chlorodisilanes $H_oSi_2Cl_{6-o}$ (o=0-6) and particulate silicon. The higher-boiling fraction not only consists of disilanes $H_oSi_2Cl6-_n$ (o=0-4), with o=0, 1 as most preferred components; as disclosed in U.S. Pat. No. 6,013, 235, a typical composition of such a high boiling residue can comprise 68 weight-% of disilanes and 31 weight-% of disiloxanes, 0.5 w % other high boiling silicon-containing compounds. The specific composition of the efflux exiting the CVD reactor of the Siemens Process as a side-product, also termed "Siemens Process side-product mixture" according to the invention, is strongly dependent on the parameters chosen for conducting the process, but a composition containing $SiCl_4$ and $HSiCl_3$ as main components and containing lower amounts by weight of the disilanes as described may be expected.

Particularly preferred, the Siemens Process side-product mixture is the sole constituent of the starting material composition according to the invention.

(5) In a further preferred embodiment of the process according to the invention, the starting material composition comprises the effluent exiting the CVD reactor of the Siemens Process as a side-product, wherein the effluent contains tetrachlorosilane as main component.

According to the invention, the term "main component" applies to the compound in a composition having the highest weight-percentage, wherein the weight-percentage refers to the ratio of the weight of a specific constituent contained in the Siemens Process side-product mixture and the total weight of the Siemens side-product mixture.

Preferably, when the starting material composition comprises the effluent exiting the CVD reactor of the Siemens Process as a side-product, wherein the effluent contains tetrachlorosilane as main component, the process according to the invention is performed in the presence of one or more additional compounds containing at least one Si—H bond selected from monosilanes G) of the general formula (VII) and disilanes H) of the general formula (VIII), more preferably selected from $MeSiH_3$, $MeSiH_2Cl$ $Me_2SiH_2$, $Me_3SiH$, $Me_2Si_2H_4$, $Me_3Si_2H_3$, $Me_4Si_2H_2$, $Me_5Si_2H$, even more preferably selected from $MeSiH_3$, $MeSiH_2CI$, $Me_2SiH_2$, $Me_2Si_2H_4$, $Me_4Si_2H_2$, most preferably $MeSiH_3$, $Me_2SiH_2$, and $Me_4Si_2H_2$.

Therein, the molar ratio of hydrogen atoms bonded to silicon atoms of the compounds H) and G) to chlorine atoms bond to the silicon atoms of the starting material composition comprising the Siemens Process side-product mixture is preferably in the range of 0.10 to 0.50, more preferably in the range from 0.10 to 0.25, and most preferably in the range from 0.15 to 0.25.

Also preferably, the Siemens Process side-product mixture containing tetrachlorosilane as main component is the sole constituent of the starting material composition according to the invention.

(6) In another embodiment of the process according to the invention, the starting material composition comprises one or more fractions obtained by fractional distillation of the effluent exiting the CVD reactor of the Siemens Process as a side-product.

Typically, the lower boiling fractions of the Siemens Process side-product mixture, in particular $SiCl_4$ and $HSiCl_3$, are removed for recycling or further processing from the side-product stream directly after exiting the CVD reactor by distillation. Further, fractional distillation allows to separate or enrich specific starting materials present in the product stream, such as disilanes, disiloxanes an oligosilanes, for submitting them to the process according to the invention in defined compositions of starting materials.

Preferably, the one or more fractions obtained by fractional distillation of the effluent exiting the CVD reactor of the Siemens Process as a side-product serving as starting material in the process according to the invention contain less than 10 weight-% of monosilanes and more than 50 weight-% of disilanes in one or more than one fractions combined.

Also preferably, the starting material composition of the process according to the invention consists exclusively of one or more fractions obtained by fractional distillation of the Siemens Process side-product mixture, more preferably exclusively of one or more fractions containing less than 10 weight-% of monosilanes and more than 50 weight-% of disilanes when combined, most preferably containing more than 70 weight-% of disilanes when combined.

(7) In a preferred embodiment of the process according to the invention, the starting material composition comprises at least disiloxanes B) of the general formulae (III) or (IV) and/or chloromonosilanes C) of the general formula (V).

Besides disilanes, chloromonosilanes C) and disiloxanes B) may constitute major constituents of the Siemens Process side-product mixture, depending on the reaction parameters.

Disiloxanes B) are in particular formed in the presence of moisture and are present in the higher-boiling disilane fraction upon distillation if present in a mixture. They can be converted into trichlorosilane and silicon tetrachloride at low temperatures by the process according the present invention.

(8) In yet another preferred embodiment of the process according to the invention, the starting material composition comprises the high-boiling fractions of the Siemens Process side-product mixture and contains disilanes as main components by weight, preferably hexachlorodisilane, pentachlorodisilane and tetrachlorodisilanes are contained as the main components, more preferably hexachlorodisilane and pentachlorodisilane are contained as the main components, most preferably hexachlorodisilane is contained as the main component by weight.

According to the invention, hexachlorodisilane, pentachlorodisilane and tetrachlorodisilanes are preferred components of the starting material composition as they are usually the main disilane side-products formed in the Siemens Process, and as they are converted to the desired chloromonosilanes by the process according to the invention, in particular to silicon tetrachloride, trichlorosilane and dichlorosilane.

(9) In a further preferred embodiment of the process according to the invention, the starting material composition comprises more than 30 weight-% of disilanes, preferably more than 40 weight-% of disilanes, more preferably more than 50 weight-% of disilanes, even more preferably more than 60 weight-% of disilanes, and most preferably more than 70 weight-% of disilanes.

In the process according to the invention, disilanes are preferred starting materials for the conversion to chloromonosilanes of the general formula (I). The content of disilanes of the starting material composition corresponds to the disilane content of the Siemens Process side-product mixture, which is preferably used as a starting material, or the disilane content of the fractions obtained by fractional distillation of the Siemens Process side-product mixture, which is also preferably used as starting material.

(10) In a preferred embodiment of the process according to the invention, the starting material composition comprises more than 15 weight-% of hydridochlorodisilanes, preferably more than 25 weight-% of hydridochlorodisilanes, more preferably more than 30 weight-% of hydridochlorodisilanes, even more preferably more than 40 weight-% of hydridochlorodisilanes, further preferably more than 50 weight-% of hydridochlorodisilanes, most preferably the starting material consists of disilanes bearing at least one hydrido substituent.

The process according to the invention is directed at the conversion of compositions containing at least one disilane of the general formula (II) with o≥1, which are typically formed during the Siemens Process as side-products, and which, upon aging and on contact with air and/or moisture, are involved in the formation of hazardous popping gels, and which themselves are more difficult to handle than organodisilanes, hexachlorodisilane or longer-chained perchlorooligosilanes regarding flammability and explosiveness. While they usually have to be converted to monosilanes by strongly energy-consuming high-temperature processes or have to be disposed by combustion, the process according to the invention allows the facile conversion of disilanes of the general formula (II) with o≥1 to chlorosilanes of the general formula (I) with n=2 to 4 at low temperatures.

(11) In a preferred embodiment of the process according to the invention, the reaction is conducted in the presence of one or more ether/HCl solutions serving as the reaction-promoting agent F), preferably in the presence of a saturated ether/HCl solution.

The utilization of ether/HCl solutions as reaction-promoting agent F) has several advantages. Notably, handling of ether/HCl solutions is preparatively facile, and ether as Lewis base activates hydrogen chloride to cleave disilanes A) of the general formula (II) and chlorinated polysilanes D) and E) already at r.t.; raising the reaction temperature is only recommended to complete di- and polysilane cleavage and to shorten the reaction times. Accordingly, hexachlorodisilane, pentachlorodisilane and tetrachlorodisilanes are reacted with ether/HCl solutions to give high yields of trichlorosilane, dichlorosilane and silicon tetrachloride already at room temperature. In such cleavage reactions using ether/HCl solutions, the proton of HCl favors attack at the silicon atom with the highest degree of chlorination. Consequently, the cleavage of $Cl_2HSi—SiHCl_2$ ($\rightarrow H_2SiCl_2+HSiCl_3$) and $Cl_3Si—SiH_2Cl$ ($\rightarrow HSiCl_3+H_2SiCl_2$) results in the formation of di- and trichlorosilane, the amount of $SiCl_4$ formed is mainly resulting from cleavage of hexachlorodisilane ($Cl_3Si—SiCl_3+HCl\rightarrow HSiCl_3+SiCl_4$), and cleavage of $Cl_3Si—SiHCl_2$ gives $HSiCl_3$ quantitatively.

In case the starting material contains disiloxanes B) of the general formulae (III) or (IV), for instance as contaminants of the high boiling disilane fraction, cleavage reactions with the ether/HCl reagent give monosilanes $H_nSiCl_{4-n}$ (n=0-2) simultaneously with smaller siloxanes $[(H_nCl_{3-}Si)_2$ O (n=0, 1)] and Si—O-containing polymers. These polymers have to be separated from volatiles and deposited or transferred into the high temperature decomposition to basically give $SCl_4$ besides solid $SiO_2$ according to U.S. Pat. No. 4,719,093.

Further highly viscous or solid chloropolysilanes, which are produced in the process according to the invention in about 15-20 weight-% based on the weight of the silicon-containing starting materials when amines, phosphines, ammonium or phosphonium salts are used as reaction-promoting agents F), are converted to monosilanes $H_nSiCl_{4-n}$ (n=0-2) by the reaction with ether/HCl solutions. Therein, the required work-up procedure becomes increasingly difficult with aging of the polymer. This requires higher cleavage temperatures (T>100° C.) and causes formation of gaseous hydrogen. Unreacted dark brown polymer is incinerated or deposited, as this polymer sometimes ignites in air and/or causes heavy explosions, even when treating with aqueous basic solutions for destruction of the polymer. Treating the disilane mixtures with ether/HCl solutions directly prevents solid polymer formation and thus strongly minimizes the risk of fire and explosions.

Utilisation of a saturated ether/HCl solution provides the maximum amount of HCl per volume unit of the HCl solution and thus lowers the amount of ether required in the process. This helps to lower the volume of the product stream and the scale of the reactor used for performing the process according to the invention, and also enhances the reaction rate. Further, utilization of saturated or nearly saturated ether/HCl solutions allows to perform the process according to the invention at low temperatures below 200° C., which is energy-saving in comparison to high-temperature work-ups at temperatures of 800 to 1300° C., and also renders the process less demanding the reactor materials and allows to conduct the process in reactors built from conventional materials.

Preferred ether/HCl solutions are $HCl/nBu_2O$ and HCl/1,4-dioxane.

(12) In another preferred embodiment of the process according to the invention, the reaction is conducted in the presence of one or more ether/HCl solutions serving as the reaction-promoting agent F), preferably in the presence of a saturated ether/HCl solution, and wherein no further reaction-promoting agent F) is present in the reaction-mixture.

Selecting one or more HCl/ether solutions as the reaction-promoting agent F) may be desirable as HCl is the most economic hydrogen source for the formation of Si—H bonds upon disilane cleavage.

This is particularly preferred in case the intermediate formation of polymeric products as described above is to be avoided, and in case the introduction of further hydrogen atoms to the reaction products via redistribution reaction with additional Si—H containing compounds as hydrogen donors is either not desired, or not required due to the overall Si—H content of the constituents of the starting material composition matching the overall Si—H content of the chlorosilanes to be obtained from the process according to the invention.

(13) In another preferred embodiment of the process according to the invention, the reaction is conducted in the presence of one or more reaction-promoting agents F) selected from the group of amines, phosphines, ammonium halides or phosphonium halides, preferably chlorides.

Disilane cleavage of the pure high boiling fraction comprising the compounds $H_oSi_2Cl_{6-o}$ (o=0-6) and devoid of the low boilers $HnSiCl_{4-n}$(n=0-2) with Lewis bases, such as triorganoamines and triorganophosphines, in particular trialkyl amines and trialkyl phosphines, and the corresponding ammonium- and phosphonium halides, in particular ammonium- and phosphonium chlorides, starts already at room temperature and is usually completed within less than 7 h at 80° C. Trichlorosilane is formed in about 70%, $H_2SiCl_2$ in about 3% and tetrachlorosilane in about 26% as volatile product fraction. The overall amount of volatiles is more than 80%, about 15-20% of a red brown solid chloropolysilane mixture are formed simultaneously. This mixture comprises linear, cyclic and branched polymers.

After separation of all volatiles from the product mixture by low temperature distillation/condensation under reduced pressure, the volatiles are distilled under normal pressure for separation of monosilanes $HnSiCl_{4-n}$ (n=0, 1, 2), for instance for reentry of $HSiCl_3$ into the CVD process; $SiCl_4$ may be converted into $HSiCl_3$ by use of silicon hydrides (see EP 18193571.9). The solid silicon polymer is converted to monosilanes $HnSiCl_{4-n}$ (n=0-2) by employment of the ether/HCl reagent under moderate conditions.

In case the effluent exiting the CVD reactor of the Siemens Process, comprising the disilanes A) of the general formula $H_oSi_2Cl_{6-o}$ (o=0-6) admixed with about 60% $SiCl_4$ (and optionally with residual $HSiCl_3$), is used for chlorosilane production, silicon hydrides, for example dimethylsilane or diethylsilane, are added in such an amount that upon disilane cleavage and $SiCl_4$ reduction by redistribution reaction, the target compound $HSiCl_3$ is formed predominantly. In case organosilanes are added, the chlorinated congeners, e.g. $R_2SiHCl$ (R=Me, Et) and $R_2SiCl_2$, are formed simultaneously and might be recycled with e.g. LiH to give silicon hydride for use in a cyclic process. $Et_2SiH_2$ can be used because of its facile handling as a liquid under normal pressure; in case gaseous dimethylsilane, $Me_2SiH_2$, is used, $Me_2SiHCl$ and $Me_2SiCl_2$, which are also valuable building blocks for silicone production, are formed, thus increasing the overall economic value of the process. High boiling hydridosilanes, such as phenylsilane, $PhSiH_3$, or suitable methyldisilanes may be used as hydrogen-donating silicon hydrides as well. In these reactions the use of polar solvents, such as high boiling diglyme, which allows facile product separation, is recommended for better dissolution of the phosphonium/ammonium chlorides, but the presence of a solvent is not necessary to perform the cleavage/hydrogenation reactions. Generally, the reactions of the process according to the invention work successfully without any solvent, and excess $SiCl_4$ can be used as solvent, while unipolar solvents like benzene and other hydrocarbons require longer reaction times. In addition to the volatile monosilanes formed, solid chloropolysilanes are produced that are—without aging—retransferred into monosilanes with the ether/HCl reagent.

Preferred amines, phosphines, ammonium halides or phosphonium halides applied as reaction-promoting agents F) are $nBu_3N$, $nBu_3P$, $nBu_4NCl$ or $nBu_4PCl$.

(14) In yet another preferred embodiment of the process according to the invention, the process is conducted in the absence of ether/HCl solutions.

It is preferred to conduct the process in the absence of ether/HCl solutions in case major amounts of hydridomonosilanes are present in the starting material, because phosphines, amines, as well as ammonium and phosphonium halides act as chlorination catalysts if HCl is present in the reaction mixture. Thus, with prolonged reactions, hydridomonosilanes are being progressively chlorinated.

(15) In a preferred embodiment of the process according to the present invention, one or more reaction-promoting agents F) are represented by the formula $R_4XCl$ with X═N or P, wherein R is independently a hydrogen group or an organyl group, more preferably a hydrogen group, an aromatic group or an aliphatic hydrocarbon group.

Examples of such preferred reaction-promoting agents F) are $nBu_4NCl$ and $nBu_4PCl$.

(16) In a further preferred embodiment of the process according to the invention, the one or more reaction-promoting agents F) represented by the formula $R_4XCl$ with X═N or P are formed in situ from compounds of the formulae $R_3X$ and RCl, wherein R is as defined above.

Herein, R independently represents a hydrogen or any organyl group as defined above. More preferably, R is independently a hydrogen or an alkyl, cycloalkyl, aryl or alkaryl group from about 1 to about 30 carbon atoms, preferably about 2 to about 16 carbon atoms.

Such reaction-promoting agents F) may be formed by addition of HCl, preferably as part of an HCl/ether solution, or an organochloride to an amine or a phosphine of the general formula $R_3X$, in the reaction mixture without a particular order of addition.

This embodiment comprises also in particular that the reaction of the process according to the invention is carried out with a mixture of a phosphine $R_3P$, wherein R is as defined above, such as $n$-$Bu_3P$, and HCl, preferably in an ether solvent.

Examples of such compounds are tributylammonium chloride and tributylphosphonium chloride, which can be formed by combining HCl/ether and tributylamine or tributylphosphine, respectively, in the reaction mixture.

Further examples are tetra(n-butyl)phosphonium chloride, methyltri(isobutyl)phosphonium chloride, tetra(n-octyl)phosphonium chloride, tri(n-butyl)tetradecylphosphonium chloride, and octyltri(butyl)phosphonium chloride, tetramethylphosphonium chloride, tetraethylphosphonium chloride, and tetrapropylphosphonium chloride.

(17) In another preferred embodiment of the process according to the invention, the reaction-promoting agent F) is selected from the group consisting of $nBu_3P$, $nBu_3N$, $nBu_4PCl$ and $nBu_4NCl$.

These reaction-promoting agents F) have been demonstrated to effectively promote the process according to the invention, are readily available at low cost and can thus be considered to be suitable agents from an economic point of view.

In general, amines, phosphines, ammonium halides and phosphonium halides, in particular $nBu_3P$, $nBu_3N$, $nBu_4PCl$ and $nBu_4NCl$, are well-soluble in silanes and ethers, and especially phosphines and amines are easy to handle on big scale because they are liquids. Phosphines and amines can thus be pumped through pipelines to ensure handling under inert conditions, and they are less moisture-sensitive when compared to, for instance, $nBu_4PCl$, which is very moisture-sensitive and forms oxides within seconds in ambient air.

The more sensitive ammonium halides and phosphonium halides are generally more effective as reaction-promoting agents F) and thus usually require lower reaction temperatures, e.g. in the redistribution reactions. The solubility of ammonium halides and phosphonium halides can be enhanced by selecting long-chained alkyl residues as organic residues R.

(18) In a preferred embodiment of the process according to the invention, the reaction is conducted in the presence of one or more additional compounds containing at least one Si—H bond selected from monosilanes G) and disilanes H), preferably in presence of one or more additional organohydridosilanes, more preferably in the presence of one or more hydridomethylsilanes, even more preferably in the presence of one or more organohydridosilanes selected from methylsilane, dimethylsilane or trimethylsilane, most preferably in the presence of dimethylsilane.

The overall hydrogen content of the process products of the general formula (I) can be raised by increasing the amount of silanes having one or several Si—H bonds in the reaction mixture. Thus either hydridochlorodisilanes or, in case reaction-promoting agents F) also effective as redistribution promoters are applied, hydridosilanes may be added in order to increase the average number of Si—H bonds of the product silanes of the general formula (I).

In case the Siemens Process side-product mixture is used as starting material, the amount of silanes in the starting material having Si—H bonds is predetermined by the parameters used in the Siemens Process, or by the selection of the fractions to be used as starting material in case the effluent from the Siemens Process CVD reactor is submitted to fractional distillation before further processing. If the content of Si—H bonds in the silane starting materials obtained from the Siemens Process is too low to obtain the desired degree of hydrogen substitution of the product monosilanes of the general formula (I), the process can be optimized by addition of hydridomonosilanes and/or hydridodisilanes providing additional Si-bound hydrogen atoms to the reaction mixture.

Preferably, the additional Si—H-containing compounds are mono- or disilanes bearing both hydrido substituents and organic substituents, as such compounds are easier to handle than silanes bearing no organic residues, and as the reaction side-products obtained from the reaction of these reagents usually can be separated from the desired monosilanes of the general formula (I) by distillation due to their higher boiling points. Further, the side-products, organochlorosilanes and/or bifunctional organohydridochlorosilanes, obtained from the conversion of the organohydridosilanes added to the reaction mixture as hydrogen donors are themselves valuable compounds for the preparation of silicones and polyorganosiloxanes.

For example, if the starting material composition of the process according to the invention comprises a Siemens Process side-product mixture containing a major amount of $SiCl_4$ in addition to disilanes of the general formula (II) and it is desired to obtain trichlorosilane as main product of the process, a sufficient amount of dimethylsilane can be added to the reaction mixture in order to convert the silicon tetrachloride to trichlorosilane according to the reaction $$SiCl_4+Me_2SiH_2\rightarrow HSiCl_3+Me_2SiHCl.$$

or alternatively:

$$2SiCl_4+Me_2SiH_2\rightarrow 2HSiCl_3+Me_2SiCl_2$$

Likewise, silicon tetrachloride generated in the cleavage of hexachlorodisilane or from dehydrogenation of $HSiCl_3$ in the process according to the invention can be transferred to tri- or dichlorosilane by addition of a sufficient amount of suitable hydridosilanes, preferably hydridoorganosilanes, and more preferably hydridomethylsilanes.

(19) In a further preferred embodiment according to the invention, the starting material composition comprises at least 40 weight-% of $SiCl_4$ and the reaction is conducted in the presence of at least one additional compound containing at least one Si—H bond selected from monosilanes G) and disilanes H), preferably in presence of one or more organohydridosilanes or organohydridodisilanes, more preferably in the presence of one or more methylhydridosilanes or methylhydridodisilanes, most preferably in the presence of dimethylhydridodisilanes In most cases, it is desired to obtain trichlorosilane or dichlorosilane as main products of the process according to the invention. Thus, presence of major amounts of silicon tetrachloride, for instance at least 40 weight-% of the starting material composition, requires the addition of suitable hydrogen donors to the reaction mixture in order to achieve an exchange of chlorine atoms for hydrogen atoms.

Besides Si—H-bond-containing monosilanes G) and disilanes H) obtained for instance from the fractional distillation of the effluent exiting the Siemens Process reactor, preferably organohydridosilanes or organohydridodisilanes are applied, more preferably methylhydridosilanes or methylhydridodisilanes are applied, and most preferably dimethylhydridodisilanes are applied as reagents to elevate the amount of Si—H-bonds in the reaction mixture, and accordingly in the silanes of the general formula (I) obtained as products.

(20) In another preferred embodiment of the process according to the invention, $SiCl_4$, $HSiCl_3$ and $H_2SiCl_2$ are obtained as main products by weight of the process, preferably $HSiCl_3$ is obtained as main product by weight.

The product distribution of the process according to the invention is determined by the distribution of constituents in the starting material composition, in particular by the amount of Si—H bonds to be found in the starting material silanes, the type of the reaction-promoting agent F) applied, and the presence of additional Si—H-bond-containing compounds serving as hydrogen donors.

In order to obtain trichlorosilane as main product, it is preferred to select starting materials with a high content of pentachlorodisilane. When ether/HCl solution is applied as reaction-promoting agent F), pentachlorodisilane is cleaved quantitatively to yield $HSiCl_3$ in the process according to the invention. Alternatively, further Si—H-bond containing starting materials and reaction-promoting agents F) which are capable of promoting the redistribution of hydrogen atoms to $SiCl_4$ present as starting material or as intermediate from the cleavage of hexachlorodisilane, perchlorinated oligo- and polysilanes or hexachlorodisiloxanes during the reaction are added to the reaction mixture of the process according to the invention.

(21) In a preferred embodiment of the process according to the invention, the $SiCl_4$ obtained in the process is converted into $HSiCl_3$ in the same step or in a subsequent step, preferably by a redistribution reaction with a silicon hydride compound, more preferably with a Si—H bond containing compound G) or H).

As already stated above, $SiCl_4$ may constitute a major component of the starting material composition, in particular when the effluent exiting the CVD reactor of the Siemens Process is used as starting material. Likewise, major amounts of $SiCl_4$ may be formed in the course of the process, for instance in the cleavage of hexachlorodisilane or perchlorinated oligo- and polysilanes.

In order to obtain $HSiCl_3$ as the product of the process according to the invention, $SiCl_4$ present in the reaction can be converted to $HSiCl_3$ by the addition of sufficient amounts of one or more silicon hydride compounds, in particular of a hydridomonosilane G) or a hydridodisilane H), in the presence of a reaction-promoting agent F) capable of promoting the redistribution of hydrogen atoms bonded to Si atoms and CI-atoms bonded to Si atoms of the silanes present in the reaction mixture. Such reaction-promoting agents F) according to the invention are amines, phosphines, phosphonium halides and ammonium halides. Alternatively, $SiCl_4$ present in the product mixture of the process according to the invention as described up to here can be separated from the product mixture, in particular by means of fractional distillation, and then be submitted separately to a redistribution reaction with a silicon hydride compound in order to obtain further $HSiCl_3$ as product of the process.

(22) In a further preferred embodiment of the process according to the invention, more than 40% of the Si atoms of the starting material composition are converted to $HSiCl_3$, preferably more than 50% of the Si atoms of the starting material composition are converted to $HSiCl_3$, more preferably more than 60% of the Si atoms of the starting material composition are converted to $HSiCl_3$, most preferably more than 70% of the Si atoms of the starting material composition are converted to $HSiCl_3$.

It is a main objective of the present invention to convert mixtures of hydridodisilanes and optionally other silanes and siloxane compounds as effective as possible to the desired monochlorosilanes of the general formula (I) in order to provide an economically and ecologically advantageous process, which is in particular valuable when the side-product mixture from the Siemens Process is used as starting material composition. Effective recycling of these waste materials is a long-standing problem, which also includes the problem of avoiding hazards when handling these materials. The effectiveness of a process directed at this problem can be measured by its atom economy, and accordingly it is desired to convert as many Si atoms of the starting material composition to chlorosilanes of the general formula (I) as possible. In general, the most desirable monosilane of the formula (I) obtainable from the process according to the invention is $HSiCl_3$.

(23) In a further preferred embodiment of the process according to the invention, the reaction is conducted in the presence of one or more reaction-promoting agents F) selected from amines, phosphines, ammonium halides or phosphonium halides, followed by removal of volatiles and subsequent conversion of the remainder to monosilanes by treatment with an ether/HCl solution.

Conducting the reaction of the process according to the invention in the presence of one or more reaction-promoting agents F) selected from amines, phosphines, ammonium halides or phosphonium halides does not only enable the cleavage of hydridodisilanes and further substrates containing Si—Si and Si—O bonds, but also enables the redistribution of Si-bonded hydrogen atoms from silicon hydrides, in particular of the components G) and H), to perchlorinated silanes present in the reaction mixture. It was found that, on the other hand, the application of the reaction-promoting agents F) selected from amines, phosphines, ammonium halides or phosphonium halides leads to the formation of solid chloropolysilanes, which are obtained as residue after the removal of volatiles from the product mixture. This solid silicon polymer is then converted to monosilanes of the general formula (I) with ether/HCl solution as reaction-promoting agent F), which ensures maximum atom economy of the process and avoids generation of potentially hazardous aged chloropolysilane gels and solids.

(24) In another preferred embodiment of the process according to the invention, no additional solvent is used.

According to the invention, the term "additional solvent" applies to all reagents which are liquids under normal conditions and/or reaction conditions and which are not either silane or siloxane compounds comprised by the definitions of one of the components A) to E) or H) and G), and which do not fall under the definition of a reaction-promoting agent F), in particular under the definition of an HCl/ether solution.

(25) In yet another preferred embodiment of the process according to the invention, the reaction is conducted in the presence of an organic solvent, preferably a high-boiling ether compound, more preferably diglyme or tetraglyme, most preferably diglyme.

According to the present invention, the term "organic solvent" refers to any organic compound or mixture of compounds which is in liquid state at room temperature, and which is suitable as a medium for conducting the reaction of the process. Accordingly, the organic solvent is preferably inert to the reaction-promoting agents F) applied according to present invention under reaction conditions. Furthermore, the starting materials of the general formulae (II)-(VIII) and the products of the general formula (I) are preferably soluble in the organic solvent or fully miscible with the solvent, respectively.

Preferably, the organic solvent is selected from optionally substituted, preferably unsubstituted linear or cyclic aliphatic hydrocarbons, aromatic hydrocarbons or ether compounds, without being limited thereto. Herein, the term "ether compound" is defined as above.

In the sense of the present invention, the term "high-boiling ether compound" is defined as an ether compound according to above definition with a boiling point at 1 bar (ambient pressure) of preferably at least about 30° C., more preferably at least about 60° C., even more preferably at least about 80° C., and most preferably at least about 100° C.

The application of high-boiling ethers in the present invention is favourable as it facilitates separation of the desired products of the general formula (I) from the reaction mixture containing the solvent and, under certain circumstances, residual starting materials. The products of the general formula (I) in general have lower boiling points than the starting materials, and the boiling points of these products are also lower than the boiling point of high-boiling ethers of above definition.

For instance, the boiling points of the products of the general formula (I) are about 8° C. ($H_2SiCl_2$), about 32° C. ($HSiCl_3$) or about 58° C. ($HSiCl_3$) under normal conditions, while the representative high-boiling ether solvent diglyme has a boiling point of about 162° C., and the boiling points hexachlorodisilane, pentachlorodisilane and an isomeric mixture of tetrachlorodisilanes, which are preferred substrates of the general formula (II), are about 145° C. at 760 mbar ($Si_2Cl_6$), 40-41° C. at 35 hPa ($Si_2HCl_5$), and 29-30° C. at 35 hPa ($Si_2H_2Cl_4$).

Application of higher-boiling ether compounds as solvents allows to utilize higher reaction temperatures and simplifies separation of the desired products from the reaction mixture by distillation.

It is noted that the choice of the most preferred solvent also depends on the reaction-promoting agent F) applied. 1,4-Dioxane and $nBu_2O$ are stable when used as solvent or ether in a reaction applying an HCl/ether solution as reaction-promoting agent F), while diglyme degrades under the elimination of MeCl and is thus not favourable under these conditions. When amines, phosphines, ammonium halides or phosphonium halides are used as reaction-promoting agents, diglyme is stable under the reaction conditions and is particularly preferred due to its higher boiling point and lower risk of hazards.

(26) In another preferred embodiment of the process according to the invention, the organic residue R in the silicon hydrides G) and H) is an alkyl group or an aryl group, more preferably a C1-C6 alkyl group, most preferably a methyl group.

The silicon hydrides G) and H) applied in the process according to the invention are selected depending on the desired properties such as content of Si—H bonds and, for instance, boiling point, and in view of the products to be obtained by the process.

In general, organic silicon hydrides of the general formulae (VII) and (VIII), i.e. silicon hydrides bearing at least one organic residue R, are preferred due to their easier handling in comparison to analogous hydridomono- and hydridodisilanes bearing no organic residues, mostly because of their lower tendency to ignite and because the compounds have higher boiling points than their unsubstituted analogues. The higher boiling point of the compounds also allows more facile separation of the silicon hydrides (VII) and (VIII) and their derivatives contained in the product mixture from the desired products of the process having the general formula (I).

The selection of the specific silicon hydrides G) and H) for the process according to the invention also depends on the availability and cost of the monosilanes G) and disilanes H), respectively. For this reason, silicon hydrides G) and H) bearing residues R which are alkyl or aryl groups, in particular C1-C6 alkyl groups or phenyl groups, are preferred reactants for the process according to the invention. As these are the technically most relevant and industrially most commonly used compounds, the silicon hydrides G) and H) bearing methyl substituents are most preferred.

Another factor to be considered in the selection of the monosilanes G) and H) is that the reaction of these additional compounds in the process according to the invention yields products which are themselves valuable compounds. For instance, chlorine/hydrogen exchange of dimethylsilane yields dimethylchlorosilane, and likewise dimethylchlorosilane yields dimethyldichlorosilane and the application of methylsilane yields methylchlorosilane, methyldichlorosilane or methyldrichlorosilane as by-products. Likewise, application of 1,1,2,2-tetramethyldisilane results in the generation of 1,1,2,2-tetramethyldichlorodisilane and dimethylchlorosilane/dimethyldichlorosilane (in minor amounts) as by-product of the process according to the invention, and the application of 1,2-dimethyldisilane results in the formation of trichloromethylsilane, dichloromethylsilane and chloromethylsilane, respectively. The formation of such by-products may contribute to the overall cost efficiency of the process according to the invention.

(27) In a preferred embodiment of the process according to the invention, the process is conducted under inert conditions.

In the sense of the present invention, the term "conducted under inert conditions" means that the process is partially or completely carried out under the exclusion of ambient air, in particular of moisture and oxygen. In order to exclude ambient air from the reaction mixture and the reaction products, closed reaction vessels, reduced pressure and/or inert gases, in particular nitrogen or argon, or combinations of such means may be used.

(28) In a further preferred embodiment of the process according to the invention, the reaction of the process is conducted at a pressure of 0.01 to 10 MPa, more preferably 0.05 to 1.0 MPa.

The indicated pressure ranges refer to the pressure measured inside the reaction vessel used when conducting the reaction of the process according to the invention.

(29) In another preferred embodiment of the process according to the invention, wherein the reaction of the process is followed by a step of separating the resulting monosilanes of the general formula (I) by distillation, low temperature condensation or a combination thereof.

Particularly preferred, the distillation step also includes separation of organomonosilanes substituted with organic residues derived from the compounds G) and H), respectively, involved in the process according to the invention.

The term "distillation" in the sense of the present invention relates to any process for separating components or substances from a liquid mixture by selective evaporation and condensation. Therein, distillation may result in practically complete separation of the constituents of a mixture, thus leading to the isolation of nearly pure compounds, or it may be a partial separation that increases the concentration of selected constituents of the mixture in the distillate when compared to the mixture submitted to distillation.

Preferably, the distillation processes can be simple distillation, fractional distillation, vacuum distillation, short path distillation or any other kind of distillation known to the skilled person.

Also preferably, the step of separating the monosilanes of the formula (I) according to the invention from the other compounds of the product mixture and/or from each other can comprise one or more batch distillation steps, or can comprise a continuous distillation process.

Further preferably, the term "low temperature condensation" may comprise separation or enrichment of one or more compounds of the general formula (I) from the reaction mixture by volatilization from the reaction vessel and condensation as a liquid and/or solid in a refrigerated vessel from which it can be subsequently recovered by distillation, or by solution in an ether solvent. Alternatively, the monosilanes can be absorbed in an ether solvent contained in a refrigerated vessel.

(30) In yet another preferred embodiment of the process according to the invention, the starting material composition contains one or more disiloxanes B).

Disiloxanes B) may be a component of the starting material composition and can be formed from mono- and/or disilanes when exposed to moisture, for instance in the Siemens Process in case moisture enters the reactor either with the stream of starting materials or moist ambient air.

In such cases, disiloxanes are contained in the effluent stream exiting the Siemens Process CVD reactor, wherein the disiloxane content may vary. Likewise, disiloxanes may be formed during handling and storage of the Siemens Process side-product mixture. By the process according to the present invention, disiloxanes B) are converted to monosilanes of the general formula (I) at low temperatures.

(31) In still another preferred embodiment of the process according to the invention, the starting material composition contains one or more perchlorinated oligo- and polysilanes D).

Perchlorinated oligo- and polysilanes D) may be present in the starting material of the process according to the invention, in particular as perchlorinated oligo- and polysilanes D) can be formed during the Siemens Process and are in such case contained in the effluent stream exiting the Siemens Process CVD reactor, wherein the specific content of perchlorinated oligo- and polysilanes D) in the Siemens Process side-product mixture may vary. By the process according to the present invention, perchlorinated oligo- and polysilanes D) are converted to monosilanes of the general formula (I) at low temperatures.

(32) In a preferred embodiment of the process according to the invention, the starting material contains one or more chloro-, hydrido- and hydroxy-substituted polysilanes, including linear, branched, cyclic and cage-like chloro-, hydrido- and hydroxy-substituted oligo- and polysilanes E).

Chloro-, hydrido- and hydroxy-substituted polysilanes, including linear, branched, cyclic and cage-like chloro-, hydrido- and hydroxy-substituted oligo- and polysilanes E) may be present in the starting material of the process according to the invention, in particular as such polysilanes E) can be formed during the Siemens Process and are in such case contained in the effluent stream exiting the Siemens Process CVD reactor, wherein the specific content of polysilanes E) in the Siemens Process side-product mixture may vary. Chloro-, hydrido- and hydroxy-substituted polysilanes E) can also be formed during handling and storage of the Siemens Process side-product mixture. By the process according to the present invention, chloro-, hydrido- and hydroxy-substituted polysilanes, including linear, branched, cyclic and cage-like chloro-, hydrido- and hydroxy-substituted oligo- and polysilanes E) are converted to monosilanes of the general formula (I) at low temperatures. Such facile conversion of the polysilanes E) is highly desirable, as many of these compounds are potentially hazardous due to their explosiveness, in particular upon aging, and usually require energy-consuming high-temperature processes for conversion to silanes, or are disposed by combustion.

(33) In another preferred embodiment of the process according to the invention, the starting material composition consists of the side-products of the Siemens Process as obtained as effluent exiting the CVD reactor of the Siemens Process.

The process according to the invention is particularly suitable for the conversion of the side-products of the Siemens Process to the desired chloromonosilanes of the general formula (I). In this embodiment of the process, no further silicon-containing compounds are added to the side-product mixture serving as starting material composition, and no constituents of the effluent exiting the CVD reactor of the Siemens Process are removed by distillation, conversion or any other means before it is submitted to the process according to the invention. This is insofar advantageous as intermediate handling or storage of the side-product mixture can be avoided if the side-product mixture stream is led directly into a reaction unit for the process according to the invention when leaving the reactor of the Siemens Process. Further, technical installations for the removal of specific fractions or components of the side-product-mixture before conducting the reaction according to the invention or for the addition of additional Si—H-containing compounds G) or H) to the starting material composition are not required.

(34) In a further preferred embodiment of the process according to the invention, the starting material composition consists of the side-products of the Siemens Process as obtained as effluent exiting the CVD reactor of the Siemens Process, which is submitted to the process directly.

By submitting the side-product mixture of the Siemens Process to the process according to the invention directly, it is possible to avoid further handling and/or storage of the side-product mixture, which considerably lowers the risk of the formation of "popping gels", which are formed by contacting chlorinated, partially hydrogenated silanes, oligo- and polysilanes with moisture and oxygen, in particular upon prolonged storage and aging of the side-product mixture. By direct conversion of the Siemens side-product mixture, potentially hazardous compounds contained in the effluent exiting the CVD reactor of the Siemens Process are converted to the desired chloromonosilanes of the general formula (I) directly, and the formation of further hazardous compounds and mixtures is prevented.

(35) In a further preferred embodiment of the process according to the invention, the starting material composition consists of the side-products of the Siemens Process as obtained as effluent exiting the CVD reactor of the Siemens Process, which is submitted to the process after intermediate storage.

In many cases, storage of the Siemens Process side-product mixture before further processing cannot be avoided. In such cases, the process according to the invention is a beneficial method to convert the side-product mixture potentially containing potentially hazardous compounds generated by contacting the side-product mixture with moisture and/or oxygen for a prolonged time to chloromonosilanes of the general formula (I), which is run at low temperatures and thus has a comparatively low energy consumption and does not require high-cost reactors designed for running high-temperature processes involving corrosive compounds.

EXAMPLES

The present invention is further illustrated by the following examples, without being limited thereto.

General:

For the low temperature conversion of disilanes $H_oSi_2Cl_{6-o}$(n=0-6) into trichlorosilane six different samples were investigated. Silane mixture 1 comprises the effluent exiting the CVD reactor of the Siemens Process and contains tetrachlorosilane as main component (63.5 mol-%) besides unreacted trichlorosilane (2.0%) and several disilanes. Silane mixture 2 is free of the two above-cited monosilanes and consists of disilanes only, with pentachlorodisilane as main component (67.5%). Silane mixture 3 consists of disilane mixture 2, admixted with $SiCl_4$ (45.8%) and diethylsilane ($Et_2SiH_2$, 40%), silane mixture 4 deals with silane mixture 2 admixed with $Si_2Cl_6$ (43%), mixture 5 consists of silane mixture 4 enriched with $Si_3Cl_1$ with 33.3% being the main component of this fraction. Silane mixture 6 contains hydridochlorodisilanes, $Si_2Cl_6$, and perchlorinated polysilanes. Except mixture 3, mixtures 1, 2, and 4-6 represent different fractions obtained from the Siemens Process. It should be noted, that the molar amounts of components within the industrial disilane fraction may vary depending from the different reaction conditions of conducting the Siemens Process. This doesn't change the nature of products formed but results in different molar ratios of components. Thus, di-, oligo- and polysilane cleavage basically results in the formation of trichlorosilane and silicon tetrachloride with some dichlorosilane in varying molar ratios. Based on the results of the di-, oligo-, and polysilane cleavage reactions performed and described in this application and the knowledge of compositions of the high boilers of the Siemens Process as starting materials, experts in the field are able to predict product formation and their molar ratios. In case highly viscous or solid polysilanes are obtained in the reactions described below, subsequent reactions of these compounds with ether/HCl solutions always deliver $HSiCl_3$/$SiCl_4$ mixtures nearly quantitatively, but in different molar ratios regarding the monosilanes. The reactions of silane mixture 1 were performed in the presence of additional hydridosilanes, e.g. diethylsilane, to obtain high yields of the target compound trichlorosilane from disilane cleavage and simultaneous selective reduction of $SiCl_4$ to give $HSiCl_3$. $Et_2SiH_2$ was used in the experiments because of its easy handling as a liquid under normal conditions. Other hydridosilanes can be used to simplify the separation of products by distillation because of different boiling points of the reaction partners and products. Disilane mixture 2 devoid of monosilanes was directly reacted with reaction-promoting agents F) to give mixtures of $HSiCl_3$ and $SiCl_4$ besides about 15-20 w % of solid chloropolysilanes (based on the total weight of disilane starting materials). As already mentioned, solid chloropolysilanes are easily reacted with the ether/HCl reagent. Reacting the silane mixture 2 directly with ether/HCl as reaction-promoting agent F) leads to the production of trichlorosilane already at r.t. in yields up to 90% without formation of any solid polysilanes. For the preparation of various ether/HCl solutions see A. G. Sturm et al, Lewis Based catalyzed selective Chlorination of Monosilanes, Chem. Eur. J. 2018, 24, 17796-17801.

The reactions were performed by mixing the reaction partners, dissolved in $C_6D_6$ or high boiling ethers, e.g. diglyme, and the reaction-promoting agent F) in an NMR tube. Reactions in diglyme as solvent are preferably recommended, because of the poor solubility of the phosphonium- and ammonium chlorides in unipolar solvents (e.g. benzene). After cooling the sample with liquid nitrogen (−196° C.), the NMR tube was evacuated under vacuum (about 0.1 mbar) and sealed to avoid any loss of low boiling monosilanes, such as $HSiCl_3$ (b.p. 32° C. under normal conditions), $H_2SiCl_2$ (b.p. 8° C. under normal conditions), $H_3SiCl$ (b.p. −30° C. under normal conditions), $SiH_4$ (b.p. −112° C. under normal conditions) and of HCl (b.p. −85° C. under normal conditions, but easy to handle dissolved in ether). The boiling point of $SiCl_4$ is 57° C. under normal conditions. NMR spectra were recorded in order to elucidate optimum reaction conditions regarding reaction time and reaction temperature. The molar ratios of products formed were determined by integration of NMR signals that were assigned to specific products within the mixture. Optimal reaction conditions were then transferred to preparative scale, either in sealed glass ampoules or in open systems.

Identification of Compounds

Products were analyzed by $^1H$ and $^{29}Si$ NMR spectroscopy. The spectra were recorded on a Bruker AV-500 spectrometer equipped with a Prodigy BBO 500 S1 probe. $^{29}Si$ NMR chemical shifts and coupling constants $^1J\{^{29}Si-^1H\}$ for the starting materials and reaction products formed are listed in Table 1. The spectroscopic data of silane starting materials and products formed are consistent with published values.

TABLE 1

$^{29}Si$ NMR spectroscopic data of mono- and disilanes.

| Silane | δ $^{29}Si$ [ppm] | $^1J_{Si—H}$ [Hz] |
|---|---|---|
| $Et_2SiH_2$ | −23.1 | 183.8 |
| $MeSiHCl_2$ | 10.9 | 280.1 |
| $Et_2SiHCl$ | 18.5 | 216.9 |
| $MeSiCl_3$ | 12.8 | — |
| $Et_2SiCl_2$ | 36.4 | — |
| $SiCl_4$ | −18.5 | — |
| $HSiCl_3$ | −9.1 | 372.6 |
| $H_2SiCl_2$ | −11.4 | 292.1 |
| $H_3SiCl$ | −37.6 | 240.3 |
| $SiH_4$ | −96.2 | 202.9 |
| $Si_2Cl_6$ | −6.0 | — |
| $Cl_3Si—SiHCl_2$ | −2.1/−8.3 | —/293.2 |
| $Cl_2HSi—SiHCl_2$ | −5.3 | 284.5 |
| $Cl_3Si—SiH_2Cl$ | 4.4/−31.6 | —/247.3 |
| $MeH_2Si—SiH_2Me$ | −67.8 | 185.8 |
| $MeClHSi—SiH_2Me$ | 0.2/−65.1 | 211.7/190.7 |
| $(MeClHSi)_2$ | −3.9/−4.3 | 220.2 |
| $MeCl_2Si—SiHClMe$ | 24.2/−6.3 | —/230.3 |
| $MeCl_2Si—SiCl_2Me$ | 17.6 | — |

TABLE 1-continued $^{29}Si$ NMR spectroscopic data of mono- and disilanes.

| Silane | δ $^{29}Si$ [ppm] | $^1J_{Si—H}$ [Hz] |
|---|---|---|
| $Me_2HSi—SiHMe_2$ | −39.5 | 177.5 |
| $Me_2ClSi—SiHMe_2$ | 22.8/−39.0 | —/181.2 |
| $Me_2ClSi—SiClMe_2$ | 17.2 | — |

Starting Materials: Disilane Mixtures 1 and 2

TABLE 2

Starting mixtures containing mono- and disilanes.*)

| silane | silane mixture 1 | disilane mixture 2 |
|---|---|---|
| $Si_2Cl_6$ | 16.6 | 7.3 |
| $HSi_2Cl_5$ | 13.4 | 67.5 |
| $(Cl_2HSi)_2$ | 2.1 | 15.0 |
| $Cl_3Si—SiH_2Cl$ | 2.5 | 10.2 |
| $SiCl_4$ | 63.5 | — |
| $HSiCl_3$ | 2.0 | — |

*)compositions in mol-%

Example 1): Reactions of the Effluent Raw Material 1 with $Et_2SiH_2$ in the Presence of Different Catalysts and $C_6D_6$ as Solvent Preparation of a stock solution: 1.9 ml of the silane mixture 1 (silane distribution is depicted in Table 2) were admixed with 0.8 ml $Et_2SiH_2$ and 2.8 ml $C_6D_6$.

0.55 ml of the stock solution and catalytic amounts (5-10 mol %, based on the molar amount of silanes in the starting material submitted to the reaction) of $nBu_4PCl$, $nBu_4NCl$, $nBu_3P$ and $nBu_3N$, respectively, were admixed in an NMR tube. The NMR tubes were cooled to −196° C., evacuated and sealed. The samples were allowed to react and analyzed by NMR spectroscopy, the results are depicted in Table 3. Notably, in all experiments a red brown polymeric solid was formed to a minor extend (15-20 w %, based on the total weight of disilane starting materials).

TABLE 3

Reactions of silane mixture 1 with $Et_2SiH_2$ and catalysts in $C_6D_6$*⁾

| silane | nBu$_4$PCl r.t. 8 h | nBu$_4$PCl 80° C. +7 h | nBu$_4$PCl 120° C. +18 h | nBu$_4$NCl r.t. 9 h | nBu$_4$NCl 80° C. +7 h | nBu$_4$NCl 120° C. +18 h | nBu$_3$P r.t. 10 h | nBu$_3$P 80° C. +7 h | nBu$_3$P 120° C. +18 h | nBu$_3$N r.t. 11 h | nBu$_3$N 80° C. +7 h | nBu$_3$N 120° C. +18 h |
|---|---|---|---|---|---|---|---|---|---|---|---|---|
| $HSiCl_3$ | 11.7 | 12.8 | 17.4 | 13.7 | 20.5 | 53.3 | 12.5 | 13.9 | 21.1 | 10.7 | 12.4 | 14.4 |
| H2SiCl$_2$ | — | — | — | — | — | 1.6 | — | — | — | — | — | — |
| $SiCl_4$ | 52.3 | 56.0 | 53.7 | 53.8 | 49.8 | 23.2 | 56.2 | 55.9 | 50.6 | 55.9 | 55.3 | 54.4 |
| $Et_2SiH_2$ | 32.4 | 30.6 | 26.0 | 32.1 | 24.3 | — | 31.3 | 28.2 | 20.7 | 33.4 | 32.3 | 31.1 |
| $Et_2SiHCl$ | — | — | 2.9 | — | 5.4 | 14.0 | — | 1.4 | 7.7 | — | — | traces |
| $Et_2SiCl_2$ | — | — | — | — | — | 7.9 | — | — | — | — | — | — |
| $Si_2Cl_6$ | 3.6 | 0.7 | — | 0.4 | — | — | — | — | — | — | — | — |

*⁾plus "+" means in addition to the afore mentioned reaction time, compositions in mol-%.

After heating the samples to 120° C. the NMR tubes were opened to separate the solutions from the solids formed. The liquid phases were transferred into new NMR tubes and additional 5 mol % (based on the molar amount of disilane starting materials employed in the first place) of the corresponding catalysts were again added. The NMR tubes were sealed and heated according to Table 4.

TABLE 4

Reactions of silane mixture 1 with $Et_2SiH_2$ and catalysts in $C_6D_6$ with prolonged heating after separation from solid polysilanes.*⁾

| silane | nBu$_4$PCl 120° C./5 h | nBu$_3$P 120° C./5 h | nBu$_3$P 120° C./50 h | nBu$_3$N 120° C./5 h | nBu$_3$N 120° C./50 h |
|---|---|---|---|---|---|
| $HSiCl_3$ | 66.1 | 22.2 | 26.4 | 15.4 | 19.8 |
| $H_2SiCl_2$ | 4.1 | — | 0.5 | — | — |
| $SiCl_4$ | 11.3 | 48.5 | 45.3 | 54.4 | 50.8 |
| $Et_2SiH_2$ | — | 21.1 | 15.1 | 27.6 | 23.0 |
| $Et_2SiHCl$ | — | 8.3 | 12.6 | 2.6 | 6.3 |
| $Et_2SiCl_2$ | 18.6 | — | — | — | — |

*⁾compositions in mol-%

In non-polar solvents ($C_6$D6) disilane cleavage and $SiCl_4$ reduction with nBu$_3$P and nBu$_3$N occurred only slowly and was stopped at 120° C. to yield $HSiCl_3$ in 20-26 mol % (within the liquid phase of the product mixture). Phosphonium chloride catalysis gave $HSiCl_3$ in 66%, $Et_2SiH_2$ was completely consumed to yield $Et_2SiCl_2$. In all other cases $Et_2SiH_2$ still remained in the reaction mixtures, chlorination resulted in the formation of $Et_2SiHCl$.

For cleavage of the polymeric residues, all solids were combined in an NMR tube that was cooled to −196° C. Subsequently, 0.5 ml of a 5M HCl/1,4-dioxane solution was added, the NMR tube was evacuated and sealed. The sample was heated to 80° C. for 2 hours, upon which the polymeric residue was almost quantitatively cleaved and only small amounts of unreacted solid particles remained (approximately 10% by weight). The NMR spectroscopic analysis of the sample revealed the following product distribution within the liquid phase: 64.7% $SiCl_4$, 35.3% $HSiCl_3$.

Example 2): Reactions of the Disilane Mixture 2 with Different Cleavage Catalysts in $C_6D_6$ as Solvent 0.2 ml of the disilane mixture 2 (silane distribution as depicted in Table 2) and catalytic amounts (5-10 mol %, based on the molar amount of silanes submitted to the reaction as starting materials) of nBu$_4$PCl, nBu$_4$NCl, nBu$_3$P and nBu$_3$N, respectively, were admixed together with 0.4 ml $C_6D_6$ as solvent in an NMR tube. The NMR tubes were cooled to −196° C., evacuated and sealed. The samples started to react at r.t. and were heated to 80° C. for completion. Analysis by NMR spectroscopy was according to Table 5.

TABLE 5

Cleavage of disilane mixture 2 with different catalysts in $C_6D_6$ as solvent.*⁾

| silane | nBu$_4$PCl r.t. 5 h | nBu$_4$PCl 80° C. +7 h | nBu$_4$NCl r.t. 5 h | nBu$_4$NCl 80° C. +7 h | nBu$_3$P r.t. 5 h | nBu$_3$P 80° C. +7 h | nBu$_3$N r.t. 5 h | nBu$_3$N 80° C. +7 h |
|---|---|---|---|---|---|---|---|---|
| $HSiCl_3$ | 69.2 | 70.2 | 69.7 | 70.7 | 69.6 | 70.0 | 71.9 | 70.8 |
| $H_2SiCl_2$ | 9.6 | 3.2 | 7.7 | 2.9 | 2.8 | 2.5 | 2.2 | 1.6 |
| $SiCl_4$ | 10.8 | 26.6 | 17.0 | 25.8 | 27.6 | 27.5 | 26.0 | 27.8 |
| $Si_2Cl_6$ | 6.5 | — | 4.4 | 0.7 | — | — | — | — |
| $HSi_2Cl_5$ | 2.2 | — | 1.2 | — | — | — | — | — |
| $(Cl_2HSi)_2$ | 1.7 | — | — | — | — | — | — | — |

*⁾plus "+" means in addition to the afore mentioned reaction time, compositions in mol-%.

All samples reacted already at r.t. to give $HSiCl_3$ in about 70 mol % (within the liquid phase), heating to 80° C. completed disilane cleavage, finally giving the byproduct $SiCl_4$ in about 27 mol %. In all reactions brown solid polymers were formed in 15-20 w % (based on the total weight of disilane starting materials) and separated from the volatiles by low temperature distillation/condensation in vacuo (0.1 mbar). Ether/HCl cleavage of the polymers gave $HSiCl_3/SiCl_4$ mixtures in a molar ratio of 36/64.

Example 3): Reactions of a Chlorosilane/$Et_2SiH_2$ Mixture (2) in the Presence of Different Catalysts and Diglyme as Solvent Preparation of a stock solution: 0.5 ml of the disilane mixture 2 (silane distribution is depicted in Table 2) were admixed with 0.9 ml $SiCl_4$, 0.6 ml $Et_2SiH_2$ and 1.0 ml $C_6D_6$. The resulting silane distribution of this sample is listed in Table 6.

TABLE 6

Composition of a chlorosilane/$Et_2SiH_2$ mixture (3).*)

| silane | silane mixture 3 |
|---|---|
| $SiCl_4$ | 45.8 |
| $Et_2SiH_2$ | 39.8 |
| $HSi_2Cl_5$ | 9.6 |
| $(Cl_2HSi)_2$ | 2.1 |
| $Cl_3Si—SiH_2Cl$ | 1.7 |
| $Si_2Cl_6$ | 1.0 |

*)compositions in mol-%.

0.2 ml of the chlorosilane/$Et_2SiH_2$ mixture 3 (silane distribution is depicted in Table 6) and catalytic amounts (5-10 mol %, based on the molar amount of starting silanes reacted) of $nBu_4PCl$, $nBu_4NCl$, $nBu_3P$ and $nBu_3N$, respectively, were admixed together with 0.4 ml diglyme as solvent in an NMR tube. The NMR tubes were cooled to −196° C., evacuated and sealed. The samples were heated and analyzed by NMR spectroscopy, the results are listed in Table 7.

TABLE 7

Reactions of silane mixture 3 with different catalysts and diglyme as solvent.*)

| | $nBu_4PCl$ | | $nBu_4NCl$ | | $nBu_3P$ | | | $nBu_3N$ | | |
|---|---|---|---|---|---|---|---|---|---|---|
| silane | 80° C. 3 h | 120° C. +16 h | 80° C. 3 h | 120° C. +16 h | 80° C. 3 h | 120° C. +16 h | 160° C. +21 h | 80° C. 3 h | 120° C. +16 h | 160° C. +21 h |
| $HSiCl_3$ | 50.9 | 64.7 | 52.0 | 62.7 | 22.1 | 36.6 | 62.9 | 25.0 | 28.5 | 38.3 |
| $H_2SiCl_2$ | — | 9.2 | 2.3 | 7.3 | — | — | 7.5 | — | — | — |
| $SiCl_4$ | 23.0 | 5.2 | 17.5 | 5.5 | 44.8 | 36.8 | 7.9 | 44.0 | 39.8 | 30.9 |
| $Et_2SiH_2$ | — | — | — | — | 33.1 | 12.2 | — | 31.0 | 25.5 | 14.3 |
| $Et_2SiHCl$ | 26.1 | — | 25.6 | — | — | 14.4 | 6.7 | — | 6.2 | 16.5 |
| $Et_2SiCl_2$ | — | 20.9 | 2.6 | 24.5 | — | — | 15.0 | — | — | — |

*)plus "+" means in addition to the afore mentioned reaction time, compositions in mol-%.

Disilane cleavage and $SiCl_4$ hydrogenation started at r.t. and $Et_2SiH_2$ was completely consumed already at 80° C. using phosphonium- and ammonium chloride as catalysts. While $Et_2SiHCl$ is formed at 80° C., it is completely reacted to $Et_2SiCl_2$ at 120° C. n-tributylphosphine and n-tributylamine are less efficient, even at 160° C. $Et_2SiHCl$ is still present in the mixtures. With $nBu_3N$, $Et_2SiCl_2$ is not formed at all, while for the phosphine the molar ratio of $HSiCl_3$ within the liquid phase is 63 mol %, with amine it is formed in 38 mol %. To show the influence of polar solvents on the cleavage/hydrogenation reactions, silane mixture 3 was comparably reacted with $nBu_3P$ in 0.4 ml $C_6D_6$ instead of diglyme as solvent. At 160° C. $HSiCl_3$ is formed in about 33 mol % (instead of 63 mol % in diglyme), $SiCl_4$ remained in 38 mol % (8 mol % in diglyme) and $Et_2SiH_2$ remained unreacted in 19 mol %. Product distributions are listed in Table 8. In this series of experiments solid polymers formed in about 15 w % based on the disilanes submitted to reaction as starting material reacted.

TABLE 8

Reaction of silane mixture 3 with $nBu_3P$ in $C_6D_6$.*)

| | nBu3P | | |
|---|---|---|---|
| silane | 80° C. 3 h | 120° C. 16 h | 160° C. 21 h |
| $HSiCl_3$ | 22.2 | 24.6 | 32.6 |
| $SiCl_4$ | 45.7 | 44.4 | 38.1 |
| $Et_2SiH_2$ | 32.1 | 28.5 | 18.8 |
| $Et_2SiHCl$ | — | 2.5 | 10.5 |

*)plus "+" means in addition to the afore mentioned reaction time, compositions in mol-%.

Example 4): Reactions of $Si_2Cl_6$* and $HSi_2Cl_5$ with $nBu_3P$ as Cleavage Catalyst (*: reaction not according to the invention)

0.2 ml $Si_2Cl_6$* and catalytic amounts (5-10 mol %, based on the molar amount of $Si_2Cl_6$ in the starting material submitted to the reaction) of $nBu_3P$ were admixed together with 0.45 ml $C_6D_6$ as solvent in an NMR tube. The NMR tube was cooled to −196° C., evacuated and sealed. The mixture was allowed to react at r.t. for 12 h and analyzed by NMR spectroscopy. The experiment was analogously repeated with $HSi_2Cl_5$ instead of $Si_2Cl_6$. The product distributions are depicted in Table 9.

TABLE 9

Reactions of $Si_2Cl_6$* and $HSi_2Cl_5$ with $nBu_3P$ in $C_6D_6$.a)

| silane | $Si_2Cl_6$* r.t./12 h | $HSi_2Cl_5$ r.t./12 h |
|---|---|---|
| $SiCl_4$ | 96.0 | 31.3 |
| $HSiCl_3$ | — | 68.7 |
| $Si_2Cl_6$ | 1.9 | — |
| neo-$Si_5Cl_{12}$ | 2.1 | — |

a)compositions in mol-%.

While hexachlorodisilane is nearly completely cleaved to only give $SiCl_4$ (96 mol % within the liquid phase) and about 2 mol % of neo-$Si_5Cl_{12}$ by Lewis base catalyzed rearrangement, no $HSiCl_3$ is obtained from this perchlorinated precursor. Instead, pentachlorodisilane gives $HSiCl_3$ in nearly 69 mol % within the liquid phase, proving that hydrido-substituents at the disilane backbone are required to form the target compound upon disilane cleavage. In both reactions red-brown chlorinated polysilanes are formed as byproducts (see example 5).

Example 5): Synthesis of $HSiCl_3$ from Disilane Mixture 2 in Preparative Scale 14.78 g of the disilane mixture 2 (disilane distribution is listed in Table 2) were placed into a Schlenk-flask, that was connected to a distillation apparatus and receiving flask. The disilane mixture was cooled to −196° C. and subsequently 0.73 g (4.9 wt %) of $nBu_3P$ were added. Upon warming the reaction mixture to room temperature the solution turned orange and disilanes already started to cleave. The reaction mixture was slowly heated to 130° C. over a period of one hour and volatiles formed continuously evaporated and were trapped in the receiving flask (−196° C.). 11.95 g of low boiling volatiles were isolated in the cooled receiving flask and analyzed by NMR spectroscopy. The product distribution is listed in Table 10 and the corresponding $^{29}Si$ NMR spectrum is shown in FIG. 2.

2.65 g of a red brown polymeric solid (17.9 wt % of the starting disilane mixture; 0.73 g of employed $nBu_3P$ excluded) remained in the reaction flask, that was insoluble in common organic solvents.

TABLE 10

Product distribution of the low boiling volatiles.

| silane | mol-% | g |
|---|---|---|
| $HSiCl_3$ | 71.9 | 8.20 |
| $SiCl_4$ | 23.4 | 3.35 |
| $H_2SiCl_2$ | 4.7 | 0.40 |

The remaining solid was reacted with 20 ml of a 5 molar solution of HCl in 1,4-dioxane at 120° C. for 48 h in a sealed glass ampoule with attached NMR tube, giving an orange solution and dark brown solid residue. After cooling the product mixture to r.t., 0.8 ml of the orange liquid phase was poured into the attached NMR tube. The ampoule and NMR tube were frozen and the NMR tube was disconnected. The product solution was analyzed by NMR spectroscopy and consisted of 35.4 mol % $HSiCl_3$ and 64.6 mol % $SiCl_4$.

Example 6): Reactions of the Silane Mixture 1 with the Methylhydridodisilanes $Me_2Si_2H_4$ and $Me_4Si_2H_2$ in the Presence of $nBu_4PCl$ and $C_6D_6$ as Solvent 0.25 ml of the silane mixture 1 (mono- and disilane distribution is depicted in Table 2), 0.1 ml of tetramethyldisilane ($Me_2HSi—SiHMe_2$) and 10 wt % of $nBu_4PCl$ (based on the total weight of disilane starting materials) were admixed together with 0.35 ml $C_6D_6$ as solvent in an NMR tube (cooled to −196° C.). The NMR tube was evacuated and sealed. The mixture was heated according to Table 11 and analyzed by NMR spectroscopy. The experiment was analogously repeated with dimethyldisilane ($MeH_2Si—SiH_2Me$, 0.05 ml) instead of tetramethyldisilane. The product distributions are depicted in Table 11.

TABLE 11

Reactions of the silane mixture 1 with the methylhydridodisilanes $Me_2Si_2H_4$ and $Me_4Si_2H_2$ in the presence of $nBu_4PCl$ and $C_6D_6$ as solvent.*⁾

| silane | $Me_4Si_2H_2$ 80° C./ 30 min | $Me_4Si_2H_2$ 120° C./ +48 h | $Me_2Si_2H_4$ 80° C./ 30 min |
|---|---|---|---|
| $HSiCl_3$ | 16.8 | 54.5 | 29.2 |
| $SiCl_4$ | 48.9 | 1.7 | 24.1 |
| $H_2SiCl_2$ | — | 20.3 | 7.6 |
| $H_3SiCl$ | — | — | 1.2 |
| $SiH_4$ | — | — | 2.8 |
| $Me_4Si_2H_2$ | 32.9 | — | — |
| $Me_4Si_2HCl$ | 0.4 | — | — |
| $Me_4Si_2Cl_2$ | 1.0 | 22.3 | — |
| $Me_2Si_2H_4$ | — | — | 18.1 |
| $Me_2Si_2H_3Cl$ | — | — | 2.5 |
| $(MeClHSi)_2$ | — | — | 1.1 |
| $Me_2Si_2HCl_3$ | — | — | 1.4 |
| $Me_2Si_2Cl_4$ | — | — | 0.8 |
| $MeSiCl_3$ | — | — | 5.7 |
| $MeSiHCl_2$ | — | — | 5.4 |
| $Me_2SiCl_2$ | — | 1.2 | — |

*⁾plus "+" means in addition to the afore mentioned reaction time, compositions in mol-%.

Both methylhydridodisilanes react as hydrogen transfer reagents to give $HSiCl_3$ in 17 mol % and 29 mol % (within the liquid phase) after 30 min at 80° C., respectively, and with formation of their chlorinated counterparts. The formation of the monosilanes $H_nSiCl_4$-n (n=0-4), $MeSiCl_3$ and $MeSiHCl_2$ proves comparative disilane cleavage, hydrogenation and redistribution reactions using dimethyldisilane for Si—Cl reduction. Heating the sample containing tetramethyldisilane to 120° C. for 48 h led to quantitative chlorination of the methyldisilane and increased formation of $HSiCl_3$ and $H_2SiCl_2$ to 54.5 and 20.3 mol % (within the liquid phase), respectively.

Example 7): Reactions of $Si_2Cl_6$* and $HSi_2Cl_5$ with HCl/1,4-Dioxane Solutions (5M)

(*: reaction not according to the invention)

0.1 ml $Si_2Cl_6$ and 0.5 ml of a 5M HCl/1,4-dioxane solution were admixed together with 0.1 ml $C_6D_6$ in an NMR tube. The NMR tube was cooled to −196° C., evacuated and sealed. The mixture was allowed to react at r.t. for 36 h and analyzed by NMR spectroscopy. The experiment was analogously repeated with $HSi_2Cl_5$ instead of $Si_2Cl_6$. The product distributions are depicted in Table 12.

TABLE 12

Reactions of $Si_2Cl_6$* and $HSi_2Cl_5$ with HCl/1,4-dioxane solutions (5M).[a)]

| silane | $HSi_2Cl_5$ r.t./36 h | $Si_2Cl_6$* r.t./36 h | $Si_2Cl_6$* r.t./66 h |
|---|---|---|---|
| $SiCl_4$ | — | 31.9 | 37.6 |
| $HSiCl_3$ | 100 | 40.7 | 47.4 |
| $Si_2Cl_6$ | — | 27.4 | 15.0 |

[a)]compositions in mol-%.

As expected, $HSi_2Cl_5$ is already completely cleaved at r.t. to give $HSiCl_3$ quantitatively, while $Si_2Cl_6$ cleavage requires longer reaction times. After 66 h $Si_2Cl_6$ remained in 15 mol % in the reaction mixture. Notably, no solid polymers formed upon disilane cleavage.

Example 8): Reactions of Disilane Mixture 2 with a HCl/1,4-Dioxane Solution (5M)

0.1 ml of the disilane mixture 2 (silane distribution is depicted in Table 1) and 0.2 ml of a 5M HCl/1,4-dioxane solution were admixed together with 0.4 ml $C_6D_6$ in an NMR tube. The NMR tubes were cooled to −196° C., evacuated and sealed. The sample was allowed to react at r.t. for 7 h, analyzed by NMR spectroscopy and further heated according to Table 13.

TABLE 13

Reactions of disilane mixture 2 with a HCl/1,4-dioxane solution (5M).*⁾

| silane | r.t. 7 h | 80° C. +7 h | 120° C. +72 h |
|---|---|---|---|
| $HSiCl_3$ | 85.3 | 83.1 | 87.5 |
| $H_2SiCl_2$ | 5.9 | 7.6 | 9.3 |
| $SiCl_4$ | 0.9 | 3.8 | 3.2 |
| $Si_2Cl_6$ | 1.7 | — | — |
| $(Cl_2HSi)_2$ | 6.0 | 5.5 | — |

*⁾plus "+" means in addition to the afore mentioned reaction time, compositions in mol-%.

Notably, Si—Si bond cleavage of hydridochlorodisilanes with concentrated HCl/ether solutions occurs very rapidly already at r.t.. In this experiment, cleavage of remaining disilanes afforded prolonged reaction times at higher temperatures due to a very low HCl concentration, but finally giving trichlorosilane in more than 87 mol % with no formation of solid byproducts.

In FIG. 1 the $^{29}Si$ NMR spectrum of the starting mixture 2 is exemplarily shown (upper part) and the result of the disilane cleavage with HCl/1,4-dioxane solution is shown beneath.

Example 9): Reactions of Siloxanes with a HCl/1,4-Dioxane Solution (2.5M) and $nBu_4PCl$ Preparation of a siloxane stock solution: 1.0 ml of the disilane mixture 2 (1.48 g, 6.5 mmol, silane distribution is depicted in Table 1) were placed in a Schlenk flask and vigorously stirred. Subsequently, 0.5 eq $H_2O$ (0.06 ml, 3.33 mmol) diluted in 2.0 ml 1,4-dioxane were slowly added via a syringe. Upon hydrolysis of the disilanes, solid siloxanes were formed giving a suspension of liquid as well as solid siloxanes together with unreacted disilanes.

In experiment a) 0.2 ml of a siloxane stock solution were admixed together with 10 weight-% $nBu_4PCl$ based on the total weight of starting disilane equivalents and 0.4 ml $C_6D_6$ as solvent in an NMR tube at −196° C. In experiment b) 0.2 ml of the siloxane stock solution were admixed together with 0.5 ml of a 2.5M HCl/1,4-dioxane solution and 0.1 ml $C_6D_6$ as solvent in an NMR tube −196° C. The NMR tubes were evacuated, sealed and heated to 120° C. for 6 h. In both experiments, solid polysiloxanes remained as insoluble residue that were not further investigated. Results of NMR spectroscopic analyses of the liquid phases are depicted in Table 14.

TABLE 14

Reactions of a siloxane solution with $nBu_4PCl$ and a 2.5M HCl/1,4-dioxane solution.*⁾

| silane | a) $nBu_4PCl$ 6 h/120° C. | 2) HCl/dioxane 6 h/120° C. |
|---|---|---|
| $HSiCl_3$ | 73.2 | 82.2 |
| $H_2SiCl_2$ | 19.6 | 12.1 |
| $SiCl_4$ | 3.6 | 1.6 |
| siloxanes | 3.6 | 4.1 |

*⁾composition of the liquid phases in mol-%.

In both experiments, $HSiCl_3$ was formed as major product (73 mol % and 82 mol %) within the liquid phase, besides $H_2SiCl_2$ (19.6% and 12.1%) and $SiCl_4$ in minor amounts (3.6% and 1.6%). Monosilane formation can occur via cleavage of non-hydrolyzed disilanes, by cleavage of the Si—Si bond in disiloxanes of the formula $(H_pSi_2Cl_{5-p})_2O$ (p=0-2) as well as by cleavage of the Si—O bond of disiloxanes $(H_qCl_{3-q}Si)_2O$ (q=0-2).

Example 10): Reactions of hydridochlorodisilanes with the $HCl/nBu_2O$ reagent (2.5M) in the presence of $Si_2Cl_6$, $Si_3Cl_6$, and perchlorinated oligo- and polysilanes Preparation of Stock Solutions:

Preparation of a stock solution with $Si_2Cl_6$ as main component: 0.8 ml of the disilane mixture 2 (silane distribution is depicted in Table 2) were admixed with 0.65 ml $Si_2Cl_6$. The solution (disilane mixture 4) was analyzed by NMR spectroscopy and the results are depicted in Table 15.

Preparation of a stock solution with $Si_3Cl_8$ as main component: 0.3 ml of the disilane mixture 4 (silane distribution is depicted in Table 15) were admixed with 0.3 ml of $Si_3Cl_s$(containing traces of iso-$Si_4Cl_{10}$ as model compound for a branched oligosilane). The solution (disilane mixture 5) was analyzed by NMR spectroscopy and the results are depicted in Table 15.

TABLE 15

Starting mixtures containing di-, tri- and tetrasilanes.*⁾

| silane | disilane mixture 4 | disilane mixture 5 |
|---|---|---|
| $Si_3Cl_8$ | — | 33.3 |
| $Si_2Cl_6$ | 42.8 | 26.9 |
| $HSi_2Cl_5$ | 42.1 | 25.4 |
| $(Cl_2HSi)_2$ | 9.3 | 8.0 |
| $Cl_3Si—SiH_2Cl$ | 5.8 | 5.4 |
| iso-$Si_4Cl_{10}$ | — | 1.0 |

*⁾compositions in mol %

Preparation of a stock solution with perchlorinated polysilanes as main component: 0.6 g of perchlorinated polysilanes (average chain length: 13 silicon atoms) were dissolved in 0.5 ml of disilane mixture 4. The solution (silane mixture 6) was analyzed by NMR spectroscopy and the $^{29}Si$ NMR spectrum is given in FIG. 3 (top).

Example 10a): Reaction of Disilane Mixture 4 with the $HCl/nBu_2O$ Reagent (2.5M)

0.1 ml of the disilane mixture 4 (silane distribution is depicted in Table 15) were admixed with 0.5 ml of the $HCl/nBu_2O$ reagent (2.5M) and 0.1 ml $C_6D_6$ as solvent in an NMR tube at −196° C. The NMR tube was evacuated, sealed and allowed to react at r.t. for 10 h. After NMR spectroscopic analyses, the sample was heated to 80° C. for 4 h, cooled to r.t. and subsequently analyzed by NMR spectroscopy again. The results are depicted in Table 16.

TABLE 16

Reaction of disilane mixture 4 with a 2.5M $HCl/nBu_2O$ solution.*⁾

| silane | r.t. 10 h | 80° C. 4 h |
|---|---|---|
| $HSiCl_3$ | 70.8 | 76.3 |
| $Si_2Cl_6$ | 20.6 | 1.5 |
| $H_2SiCl_2$ | 3.7 | 2.5 |
| $SiCl_4$ | 1.4 | 19.7 |
| $(Cl_2HSi)_2$ | 3.5 | — |

*⁾compositions in mol-%.

Example 10b): Reaction of Disilane Mixture 5 with the $HCl/nBu_2O$ Reagent (2.5M)

In analogy to example 10a, 0.1 ml of the disilane mixture 5 (silane distribution is depicted in Table 15) were admixed together with 0.5 ml of the $HCl/nBu_2O$ reagent (2.5M) and 0.1 ml $C_6D_6$ as solvent in an NMR tube at −196° C. The NMR tube was evacuated, sealed and allowed to react at r.t. for 10 h. After NMR spectroscopic analyses, the sample was heated to 80° C. for 4 h, cooled to r.t. and subsequently analyzed by NMR spectroscopy again. The results are depicted in Table 17.

TABLE 17

Reaction of disilane mixture 5 with a 2.5M $HCl/nBu_2O$ solution.*⁾

| silane | r.t. 10 h | 80° C. 4 h |
|---|---|---|
| $HSiCl_3$ | 66.2 | 72.7 |
| $Si_2Cl_6$ | 26.1 | 1.0 |
| $H_2SiCl_2$ | 2.0 | 1.9 |
| $SiCl_4$ | 3.8 | 24.2 |
| $(Cl_2HSi)_2$ | 1.9 | — |

*⁾compositions in mol-%.

Example 10c): Reaction of Silane Mixture 6 (Containing Hydridochlorodisilane and Perchlorinated Polysilanes) with the $HCl/nBu_2O$ Reagent (2.5M)

In analogy to example 10a, 0.08 ml of the silane mixture 6 were admixed together with 0.5 ml of the $HCl/nBu_2O$ reagent (2.5M) and 0.1 ml $C_6D_6$ as solvent in an NMR tube at −196° C. The NMR tube was evacuated, sealed and allowed to react at r.t. for 10 h. After NMR spectroscopic analyses, the sample was heated to 80° C. for 4 h, cooled to r.t. and subsequently analyzed by NMR spectroscopy again. The results are depicted in Table 18, and the $^{29}Si$ NMR spectrum is shown in FIG. 3 (bottom).

TABLE 18

Reaction of silane mixture 6 with a 2.5M $HCl/nBu_2O$ solution.*⁾

| silane | r.t. 10 h | 80° C. 4 h |
|---|---|---|
| $HSiCl_3$ | 72.4 | 73.7 |
| $Si_2Cl_6$ | 17.6 | 15.6 |
| $H_2SiCl_2$ | 6.3 | 7.9 |
| $SiCl_4$ | 1.4 | 1.7 |
| $(Cl_2HSi)_2$ | 2.3 | 1.1 |

*⁾compositions in mol-%.

In all three experiments (10a-c) $HSiCl_3$ was formed as major product (71 mol %, 66 mol % and 72 mol %) already after 10 h at room temperature. The hexachlorodisilane remained present in up to 26 mol %, whereas all other di-, oligo and polysilanes were almost quantitatively cleaved. Heating the samples to 80° C. for additional 4 hours further increased the formation of $HSiCl_3$, and $Si_2Cl_6$ remained present in only 1-2 mol % (Example 10a and 10b). The product distribution in 10c) did not change significantly after heating because almost all HCl was already consumed during the first reaction period; additional ether/HCl-solution cleaved hexachlorodisilane nearly quantitatively, thus further increasing the amounts of tetrachlorosilane and trichlorosilane.

PREFERRED EMBODIMENTS OF THE INVENTION

In the following the preferred embodiments of the invention are shown.

Embodiment 1

A process for the production of chlorosilanes of the general formula (I)

$$H_{4-n}SiCl_n \quad (I)$$

wherein n=2, 3 and 4, preferably n=3, by reacting a starting material composition comprising one or more of the substrates selected from A) disilanes of the general formula (II)

$$H_oSi_2Cl_{6-o} \quad (II)$$

wherein o=0-6, preferably o=0-2, most preferably 0-1, and wherein for one or more disilanes o≥1, and optionally further comprising B) disiloxanes of the general formulae (III) or (IV)

$$(H_pSi_2Cl_{5-p})_2O \quad (III)$$

$$(H_qCl_{3-q}Si)_2O \quad (IV)$$

wherein p=0-5, preferably p=0-1, q=0-2, more preferably q=0-1,

C) chloromonosilanes of the general formula (V)

$$SiH_rCl_{4-r} \quad (V)$$

wherein r=0-2, preferably r=0-1, most preferably r=0,

D) perchlorinated oligo- and polysilanes of the general formula (VI)

$$Si_sCl_{2s+2} \quad (VI)$$

wherein s=3-6,

E) chloro-, hydrido- and hydroxy-substituted polysilanes, including linear, branched, cyclic and cage-like chloro-, hydrido- and hydroxy-substituted oligo- and polysilanes, and chloro-, hydrido- and hydroxy-substituted polysiloxanes, with one or more reaction-promoting agents F) selected from the group consisting of ether/HCl solutions, amines, phosphines, or mixtures thereof, and ammonium halides, phosphonium halides, or mixtures thereof, optionally in the presence of one or more additional compounds containing at least one Si—H bond selected from G) monosilanes of the general formula (VII)

$$R_tSiCl_uH_{4-(t+u)} \quad \text{(VII)}$$

wherein t=0-3, preferably 1-3, more preferably 2, u=0-2, preferably 0, t+u=0-3, preferably 1-3, more preferably 2, R is an organic residue, H) disilanes of the general formula (VIII)

$$R_vSi_2Cl_wH_{6-(v+w)} \quad \text{(VIII)}$$

wherein v=0-5, preferably 1-5, w=0-5, preferably 0, v+w=1-5,

R is defined as above, at temperatures below 200° C.

Embodiment 2

Process according to embodiment 1, wherein the disilane with o≥1 is pentachlorodisilane, more preferably the disilanes with o≥1 are pentachlorodisilane and one or two tetrachlorodisilane isomers, even more preferably the disilane with o≥1 is pentachlorodisilane, wherein hexachlorodisilane is also present in the starting material composition, and most preferably the disilanes with o≥1 are pentachlorodisilane and one or two tetrachlorodisilane isomers, wherein hexachlorodisilane is also present in the starting material composition.

Embodiment 3

Process according to embodiment 1 or 2, wherein the temperature is in the range from 10° C. to 160° C., more preferably from 15° C. to 130° C., even more preferably from 20° C. to 100° C., most preferably in the range from 20-80° C.

Embodiment 4

Process according to any of the previous embodiments, wherein the starting material composition comprises the effluent exiting the CVD reactor of the Siemens Process as a side-product.

Embodiment 5

Process according to any of the previous embodiments, wherein the starting material composition comprises the effluent exiting the CVD reactor of the Siemens Process as a side-product, wherein the effluent contains tetrachlorosilane as main component.

Embodiment 6

Process according to any of the previous embodiments, wherein the starting material composition comprises one or more fractions obtained by fractional distillation of the effluent exiting the CVD reactor of the Siemens Process as a side-product.

Embodiment 7

Process according to any of the previous embodiments, wherein the starting material composition comprises at least the components B) and/or C).

Embodiment 8

Process according to any of the previous embodiments, wherein the starting material composition comprises the high-boiling fractions of the side-products of the Siemens Process and contains disilanes as main components by weight, preferably hexachlorodisilane, pentachlorodisilane and tetrachlorodisilanes are contained as the main components, more preferably hexachlorodisilane and pentachlorodisilane are contained as the main components, most preferably hexachlorodisilane is contained as the main component by weight.

Embodiment 9

Process according to any of the previous embodiments, wherein the starting material composition comprises more than 30 weight-% of disilanes, preferably more than 40 weight-% of disilanes, more preferably more than 50 weight-% of disilanes, even more preferably more than 60 weight-% of disilanes, and most preferably more than 70 weight-% of disilanes.

Embodiment 10

Process according to any of the previous embodiments, wherein the starting material composition comprises more than 15 weight-% of hydridochlorodisilanes, preferably more than 25 weight-% of hydridochlorodisilanes, more preferably more than 30 weight-% of hydridochlorodisilanes, even more preferably more than 40 weight-% of hydridochlorodisilanes, further preferably more than 50 weight-% of hydridochlorodisilanes, most preferably the starting material consists of disilanes bearing at least one hydrido substituent.

Embodiment 11

Process according to any of the previous embodiments, wherein the reaction is conducted in the presence of one or more ether/HCl solutions serving as reaction-promoting agent F), preferably a saturated ether/HCl solution.

Embodiment 12

Process according to any of the previous embodiments, wherein the reaction is conducted in the presence of one or more ether/HCl solutions serving as reaction-promoting agent F), preferably a saturated ether/HCl solution, and wherein no further reaction-promoting agent F) is present in the reaction mixture.

Embodiment 13

Process according to embodiments 1-11, wherein the reaction is conducted in the presence of one or more reaction-promoting agents F) selected from the group of amines, phosphines, ammonium halides or phosphonium halides, preferably chlorides.

Embodiment 14

Process according to embodiments 1-10 and 13, wherein the process is conducted in the absence of ether/HCl solutions.

Embodiment 15

Process according to the embodiments 1-11 and 13-14, wherein one or more reaction-promoting agents F) are represented by the formula $R_4XCl$ with X═N or P, wherein R is independently a hydrogen group or an organyl group, more preferably a hydrogen group, an aromatic group or an aliphatic hydrocarbon group.

Embodiment 16

Process according to embodiment 15, wherein one or more reaction-promoting agents F) represented by the formula $R_4XCl$ with X═N or P are formed in situ from compounds of formulae $R_3X$ and RCl.

Embodiment 17

Process according to embodiments 1-11 and 13-16, wherein the reaction-promoting agent F) is selected from the group consisting of $nBu_3P$, $nBu_3N$, $nBu_4PCl$ and $nBu_4NCl$.

Embodiment 18

Process according to any of the previous embodiments, wherein the reaction is conducted in the presence of one or more additional compounds containing at least one Si—H bond selected from monosilanes G) and disilanes H), preferably in presence of one or more additional organohydridosilanes, more preferably in the presence of one or more hydridomethylsilanes, even more preferably in the presence of one or more organohydridosilanes selected from methylsilane, dimethylsilane or trimethylsilane, most preferably in the presence of dimethylsilane.

Embodiment 19

Process according to any of the previous embodiments, wherein the starting material comprises at least 40 weight-% of $SiCl_4$ and the reaction is conducted in the presence of at least one additional compound containing at least one Si—H bond selected from monosilanes G) and disilanes H), preferably in presence of one or more organohydridosilanes or organohydridodisilanes, more preferably in the presence of one or more methylhydridosilanes or methylhydridodisilanes, most preferably in the presence of dimethylhydridodisilanes.

Embodiment 20

Process according to any of the previous embodiments, wherein $SiCl_4$, $HSiCl_3$ and $H_2SiCl_2$ are obtained as main products of the process by weight, preferably $HSiCl_3$ is obtained as main product by weight.

Embodiment 21

Process according to any of the previous embodiments, wherein the $SiCl_4$ obtained in the process is converted into $HSiCl_3$ in the same step or in a subsequent step, preferably by a redistribution reaction with a silicon hydride compound, more preferably with a Si—H bond containing compound G) or H).

Embodiment 22

Process according to any of the previous embodiments, wherein more than 40% of the Si atoms of the starting material composition are converted to $HSiCl_3$, preferably more than 50% of the Si atoms of the starting material composition are converted to $HSiCl_3$, more preferably more than 60% of the Si atoms of the starting material composition are converted to $HSiCl_3$, most preferably more than 70% of the Si atoms of the starting material composition are converted to $HSiCl_3$.

Embodiment 23

Process according to any of the previous embodiments, wherein the reaction is conducted in the presence of one or more reaction-promoting agents F) selected from amines, phosphines, ammonium halides or phosphonium halides, followed by removal of volatiles and subsequent conversion of the remainder to monosilanes by treatment with an HCl/ether solution.

Embodiment 24

Process according to any of the previous embodiments, wherein no additional solvent is used.

Embodiment 25

Process according to embodiments 1 to 23, wherein the reaction is conducted in the presence of an organic solvent, preferably a high-boiling ether compound, more preferably 1,4-dioxane, di-n-butyl ether, diglyme or tetraglyme, most preferably diglyme.

Embodiment 26

Process according to any of the previous embodiments, wherein the organic residue R in the silicon hydrides G) and H) is an alkyl group or an aryl group, more preferably a C1-C6 alkyl group, most preferably a methyl group.

Embodiment 27

Process according to any of the previous embodiments, wherein the process is conducted under inert conditions.

Embodiment 28

Process according to any of the previous embodiments, wherein the reaction of the process is conducted at a pressure of 0.01 to 10 MPa, more preferably 0.05 to 1.0 MPa.

Embodiment 29

Process according to any of the previous embodiments, wherein the reaction of the process is followed by a step of separating the resulting monosilanes of the general formula (I) by distillation, low temperature condensation or a combination thereof.

Embodiment 30

Process according to any of the previous embodiments, wherein the starting material composition contains one or more disiloxanes B).

Embodiment 31

Process according to any of the previous embodiments, wherein the starting material composition contains one or more perchlorinated oligo- and polysilanes D).

Embodiment 32

Process according to any of the previous embodiments, wherein the starting material composition contains one or more chloro-, hydrido- and hydroxy-substituted polysilanes, including linear, branched, cyclic and cage-like chloro-, hydrido- and hydroxy-substituted oligo- and polysilanes E).

Embodiment 33

Process according to any of the previous embodiments, wherein the starting material composition consists of the side-products of the Siemens Process as obtained as effluent exiting the CVD reactor of the Siemens Process.

Embodiment 34

Process according to any of the previous embodiments, wherein the starting material composition consists of the side-products of the Siemens Process as obtained as effluent exiting the CVD reactor of the Siemens Process, which is submitted to the process directly.

Embodiment 35

Process according to the embodiments 1-33, wherein the starting material composition consists of the side-products of the Siemens Process as obtained as effluent exiting the CVD reactor of the Siemens Process, which is submitted to the process after intermediate storage.

It will be understood that any numerical range recited herein includes all sub-ranges within that range and any combination of the various endpoints of such ranges or sub-ranges, be it described in the examples or anywhere else in the specification.

It will also be understood herein that any of the components of the invention herein as they are described by any specific genus or species detailed in the examples section of the specification, can be used in one embodiment to define an alternative respective definition of any endpoint of a range elsewhere described in the specification with regard to that component, and can thus, in one non-limiting embodiment, be used to supplant such a range endpoint, elsewhere described.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

The invention claimed is:

1. A process for the production of chlorosilanes of the general formula (I)

$$H_{4-n}SiC_l \qquad (I)$$

wherein n is from 2 to 4, by reacting a starting material composition comprising one or more of the substrates selected from A) disilanes of the general formula (II)

$$H_oSi_2Cl_{6-o} \qquad (II)$$

wherein o=1-6 with one or more reaction-promoting agents F) selected from the group consisting of ether/HCl solutions, amines, phosphines, or mixtures thereof, and ammonium halides, phosphonium halides, or mixtures thereof, at temperatures below 200° C., wherein the reaction is conducted in the presence of one or more reaction-promoting agents F) selected from amines, phosphines, ammonium halides or phosphonium halides, followed by removal of volatiles and subsequent conversion of the remainder to monosilanes by treatment with an HCl/ether solution, wherein the starting material composition contains disilanes as main components by weight, the starting material composition comprises more than 40 weight-% of disilanes by weight, the starting material composition comprises more than 15 weight-% pf hydrochlorodisilanes, and, wherein $HSiCl_3$ is obtained as the main product by weight.

2. The process according to claim 1, wherein the disilane with o≥1 is pentachlorodisilane.

3. The process according to claim 1, wherein the starting material composition comprises the effluent exiting the CVD reactor of the Siemens Process as a side-product.

4. The process according to claim 1, wherein the starting material composition comprises one or more fractions obtained by fractional distillation of the effluent exiting the CVD reactor of the Siemens Process as a side-product.

5. The process according to claim 1, wherein the starting material composition further comprises at least B) disiloxanes of the general formulae (III) or (IV)

$$(H_pSi_2Cl_{5-p})_2O \qquad (III)$$

$$(H_qCl_{3-q}Si)_2O \qquad (IV)$$

wherein p=0-5, q=0-2.

6. The process according to claim 1, wherein the reaction is conducted in the presence of one or more ether/HCl solutions serving as reaction-promoting agent F).

7. The process according to claim 1, wherein one or more reaction-promoting agents F) are represented by the formula $R_4XCl$ with X═N or P, wherein R is independently a hydrogen group or an organyl group.

8. The process according to claim 1, wherein the reaction-promoting agent F) is selected from the group consisting of $nBu_3P$, $nBu_3N$, $nBu_4PCl$ and $nBu_4NCl$.

9. The process according to claim 1, wherein the reaction is conducted in the presence of one or more additional compounds containing at least one Si—H bond selected from monosilanes G), monosilanes of the general formula (VII)

$$R_tSiCl_uH_{4-(t+u)} \qquad (VII)$$

wherein t=0-3, u=0-2, t+u=0-3,

R is an organic residue, and H), disilanes of the general formula (VIII)

$R_vSi_2Cl_wH_{6-(v+w)}$ (VIII)

wherein v=0-5,
w=0-5,
v+w=1-5,
R is an organic residue.

10. The process according to claim 1, wherein more than 40 % of the Si atoms of the starting material composition are converted to $HSiCl_3$.

11. The process according to claim 1, wherein the starting material composition further contains one or more perchlorinated oligo- and polysilanes D) of the general formula (VI)

$Si_3Cl_{2s+2}$ (VI)

wherein s=3-6.

12. The process according to claim 1, wherein the starting material composition further contains one or more chloro-, hydrido- and hydroxy-substituted polysilanes, including linear, branched, cyclic and cage-like chloro-, hydrido- and hydroxy-substituted oligo-and polysilanes E).

13. The process according to claim 1, further comprising a component (C) chloromonosilanes of the general formula (V)

$SiH_rCl_{4-r}$ (V)

wherein r=0-2.

14. The process according to claim 1, wherein the subscripts n=3, o=1 or 2.

15. The process according to claim 9, wherein the one or more additional compounds containing at least one Si—H bond selected from monosilanes G) and disilanes H) are selected from the group consisting of methylsilane, dimethylsilane and trimethylsilane.

16. The process according to claim 10, wherein more than 70% of the Si atoms of the starting material composition are converted to $HSiCl_3$.

17. The process according to claim 9, wherein in the
G) monosilanes of the general formula (VII)

$R_tSiCl_uH_{4-(t+u)}$ (VII)

t=1-3,
u=0-2,
t+u=1-3,
R is an organic residue,
and in the
H) disilanes of the general formula (VIII)

$R_vSi_2Cl_wH_{6-(v+w)}$ (VIII)

wherein v=1-5,
w=0-5,
v+w=1-5,
R is an organic residue.

18. A process for the production of chlorosilanes of the general formula (I)

$H_{4-n}SiCl_n$ (I)

wherein n is from 2 to 4,
by reacting a starting material composition comprising one or more of the substrates selected from
A) disilanes of the general formula (II)

$H_oSi_2Cl_{6-o}$ (II)

wherein o=1-6
and
comprising one or more additional compounds containing at least one Si—H bond selected from
G) monosilanes of the general formula (VII)

$R_tSiCl_uH_{4-(t+u)}$ (VII)

wherein t=1-3,
u=0-2,
t+u=1-3,
R is an organic residue,
H) disilanes of the general formula (VIII)

$R_vSi_2Cl_wH_{6-(v+w)}$ (VIII)

wherein v=1-5,
w=0-5,
v+w=1-5,
R is an organic residue,
with one or more reaction-promoting agents F) selected from the group consisting of
amines, phosphines, or mixtures thereof, and
ammonium halides, phosphonium halides, or mixtures thereof,
at temperatures below 200° C.,
wherein the starting material composition contains disilanes as main components by weight,
the starting material composition comprises more than 40 weight-% of disilanes by weight,
the starting material composition comprises more than 15 weight-% of hydridochlorodisilanes,
and
wherein $HSiCl_3$ is obtained as the main product by weight.

19. A process for the production of chlorosilanes of the general formula (I)

$H_{4-n}SiCl_n$ (I)

wherein n is from 2 to 4,
by reacting a starting material composition comprising one or more of the substrates selected from
A) disilanes of the general formula (II)

$H_oSi_2Cl_{6-0}$ (II)

wherein o=1-6
and
further comprising one or more of the substrates selected from
B) disiloxanes of the general formulae (III) or (IV)

$(H_pSi_2Cl_{5-p})_2O$ (III)

$(H_qCl_{3-q}Si)_2O$ (IV)

wherein p=0 -5, q=0-2,
with one or more reaction-promoting agents F) selected from the group consisting of
ether/HCl solutions,
amines, phosphines, or mixtures thereof, and
ammonium halides, phosphonium halides, or mixtures thereof,
at temperatures below 200° C.,
wherein the starting material composition contains disilanes as main components by weight,
the starting material composition comprises more than 40 weight-% of disilanes by weight,
the starting material composition comprises more than 15 weight-% of hydridochlorodisilanes, and
wherein $HSiCl_3$ is obtained as the main product by weight.

20. A process for the production of chlorosilanes of the general formula (I)

$H_{4-n}SiCl_n$ (I)

wherein n is from 2 to 4,
by reacting a starting material composition comprising one or more of the substrates selected from

47

A) disilanes of the general formula (II)

$$H_oSi_2Cl_{6-0} \qquad (II)$$

wherein o=1-6
and
further comprising one or more of the substrates selected from D) perchlorinated oligo- and polysilanes of the general formula (VI)

$$Si_sCl_{2s+2} \qquad (VI)$$

wherein s=3-6,
and

E) chloro-, hydrido- and hydroxy-substituted polysilanes, including linear, branched, cyclic and cage-like chloro-, hydrido- and hydroxy-substituted oligo- and polysilanes, and chloro-, hydrido- and hydroxy-substituted polysiloxanes,

48 with one or more reaction-promoting agents F) selected from the group consisting of ether/HCl solutions, amines, phosphines, or mixtures thereof, and ammonium halides, phosphonium halides, or mixtures thereof, at temperatures below 200° C., wherein the starting material composition contains disilanes as main components by weight, the starting material composition comprises more than 40 weight-% of disilanes by weight, the starting material composition comprises more than 15 weight-% of hydridochlorodisilanes, and wherein $HSiCl_3$ is obtained as the main product by weight.

* * * * *